United States Patent
Johns et al.

(10) Patent No.: US 7,836,919 B2
(45) Date of Patent: Nov. 23, 2010

(54) DEVICE FOR LOADING CHEMICAL REACTOR TUBES

(75) Inventors: Clifford L Johns, Louisville, KY (US); Daniel D. Sympson, Louisville, KY (US); August M. Dattilo, III, Louisville, KY (US); Munaf Najmuddin Chasmawala, Louisville, KY (US); Manfred Schmidt, Louisville, KY (US)

(73) Assignee: Tubemaster Inc., Louisville, KY (US)

( * ) Notice: Subject to any disclaimer, the term of this patent is extended or adjusted under 35 U.S.C. 154(b) by 1082 days.

(21) Appl. No.: 11/535,841

(22) Filed: Sep. 27, 2006

(65) Prior Publication Data
US 2007/0098605 A1 May 3, 2007

Related U.S. Application Data

(60) Provisional application No. 60/723,028, filed on Oct. 3, 2005.

(51) Int. Cl.
*B01J 8/06* (2006.01)
*B65B 1/04* (2006.01)

(52) U.S. Cl. .................... 141/1; 422/196; 422/197; 422/219; 141/98; 141/391

(58) Field of Classification Search .................. None
See application file for complete search history.

(56) References Cited

U.S. PATENT DOCUMENTS

| 3,223,490 | A | 12/1965 | Sacken et al. |
|---|---|---|---|
| 3,608,751 | A | 9/1971 | Hundtofte |
| 3,788,370 | A | 1/1974 | Hare et al. |
| 3,829,983 | A | 8/1974 | White |
| 3,913,806 | A | 10/1975 | Red, Jr. |
| 4,077,530 | A * | 3/1978 | Fukusen et al. ............ 414/804 |
| 4,402,643 | A | 9/1983 | Lytton et al. |
| 4,701,101 | A | 10/1987 | Sapoff |
| 5,746,258 | A | 5/1998 | Huck |
| 6,409,977 | B2 | 6/2002 | Harper et al. |
| 6,880,591 | B2 | 4/2005 | Goemans et al. |
| 6,905,660 | B2 | 6/2005 | Harper et al. |
| 7,121,309 | B2 | 10/2006 | Goemans et al. |
| 2003/0031536 | A1 * | 2/2003 | Boe et al. .................. 414/160 |
| 2004/0191135 | A1 | 9/2004 | Johns et al. |

FOREIGN PATENT DOCUMENTS

| DE | 2062601 | 12/1970 |
|---|---|---|
| GB | 2186209 | 1/1987 |
| JP | 10024232 | 1/1998 |

OTHER PUBLICATIONS

Inventor's sketch of funnel prior to 2006.

* cited by examiner

*Primary Examiner*—Jennifer A Leung
(74) *Attorney, Agent, or Firm*—Theresa Fritz Camoriano; Guillermo Camoriano; Camoriano and Associates

(57) ABSTRACT

A device and method for loading pellets into chemical reactor tubes.

9 Claims, 36 Drawing Sheets

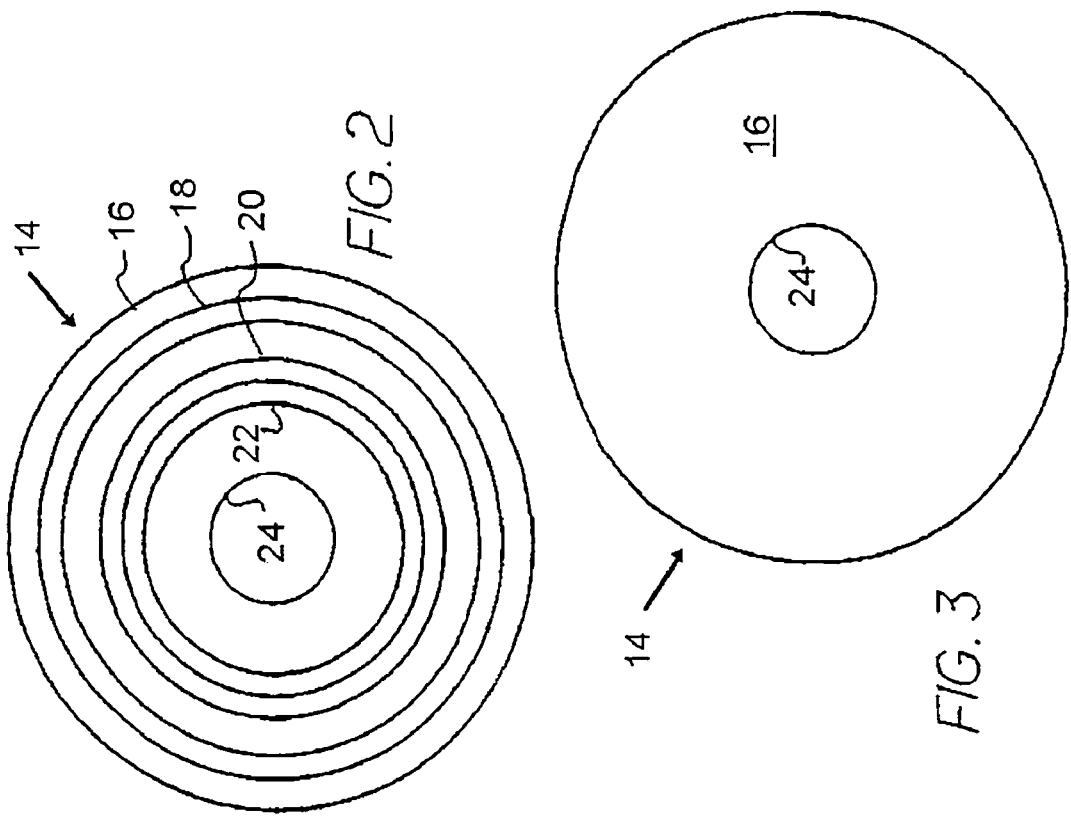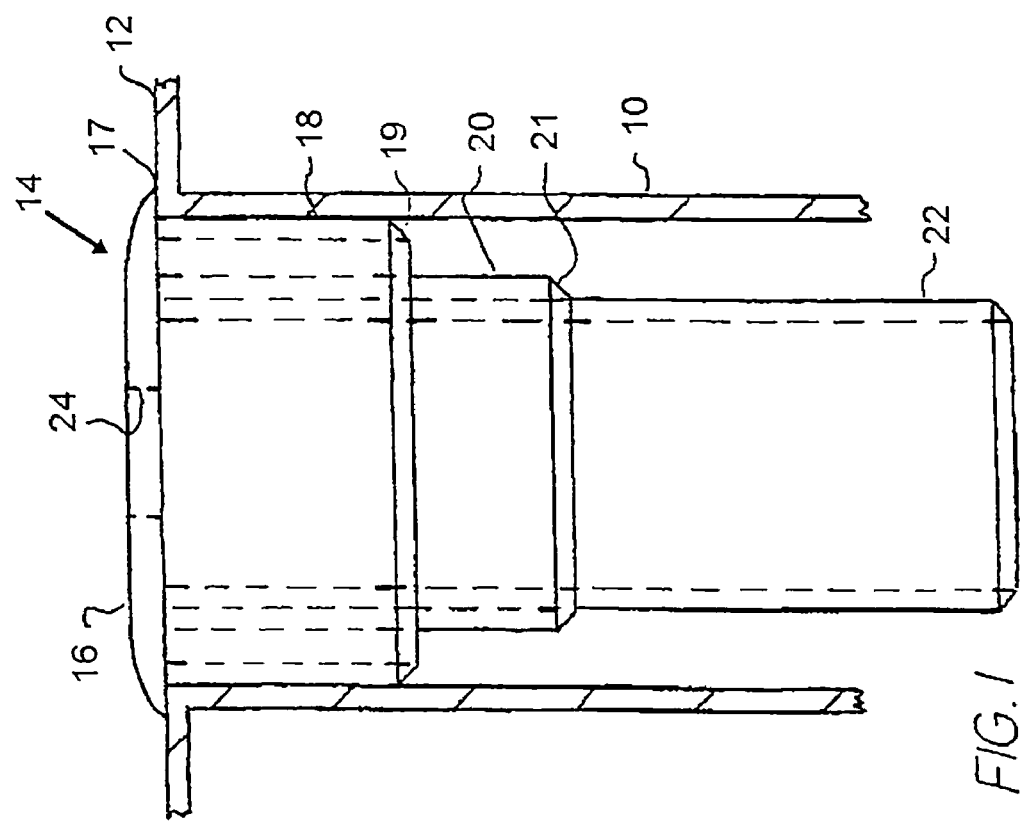

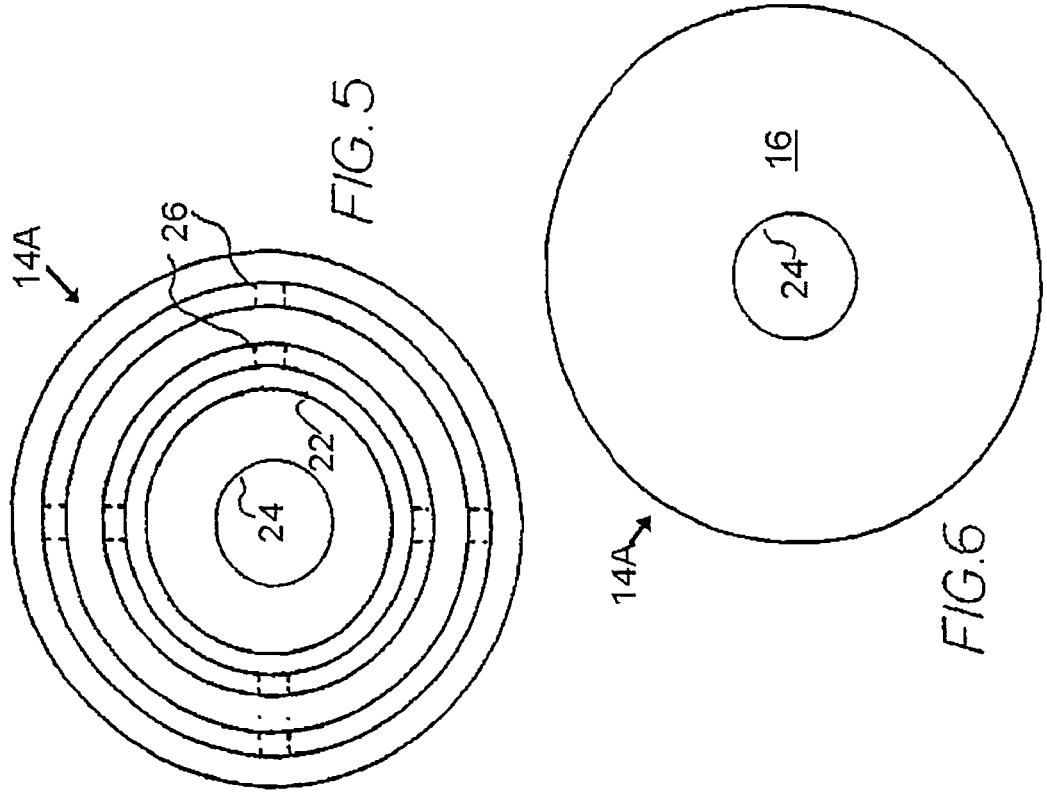
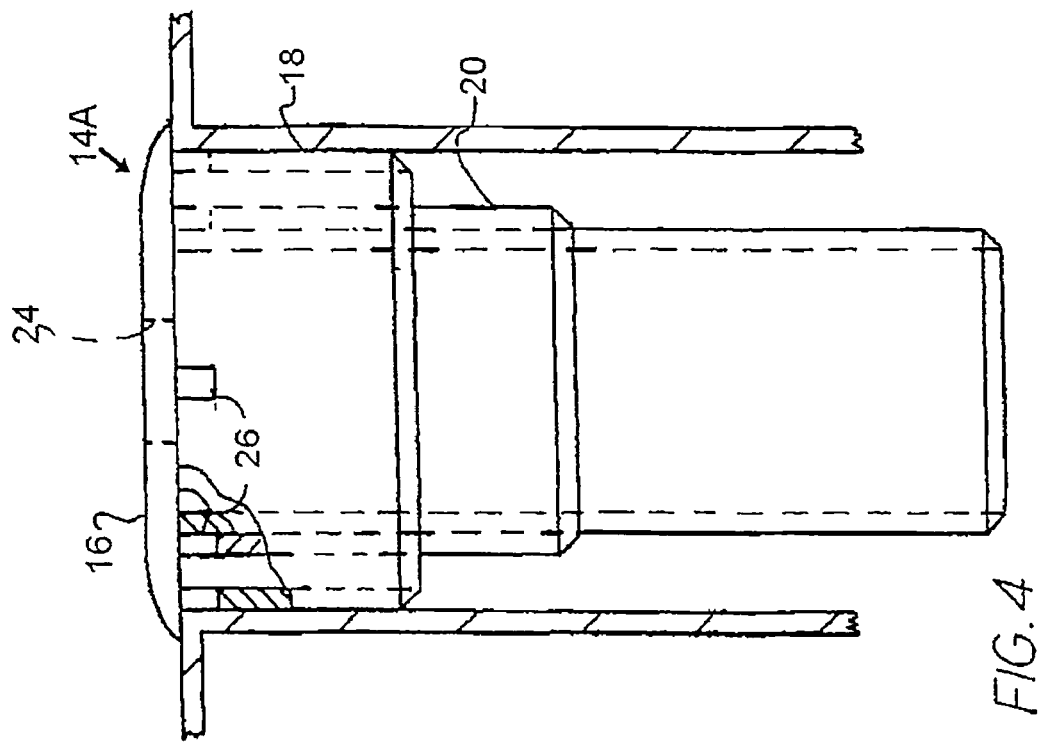

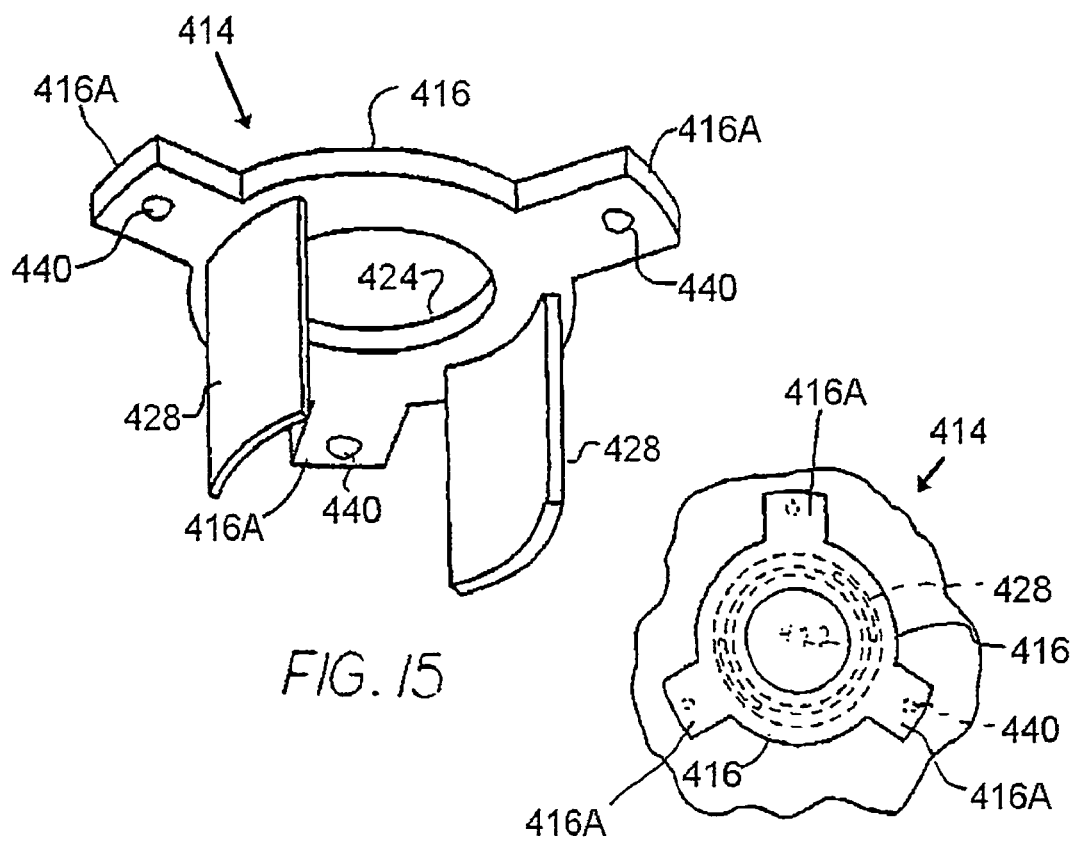
FIG. 15
FIG. 16
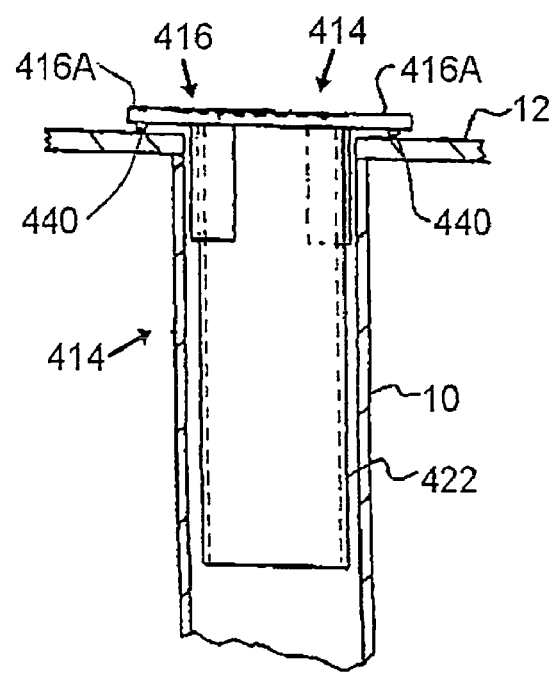
FIG. 17

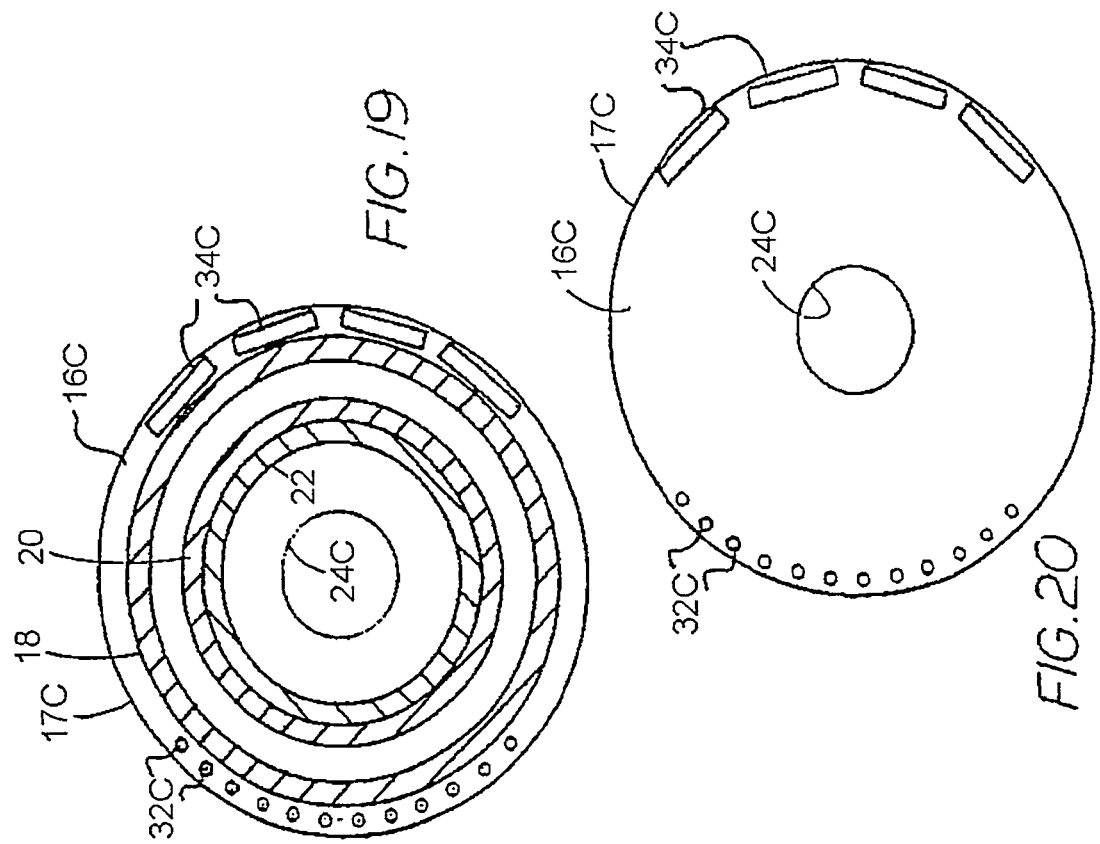
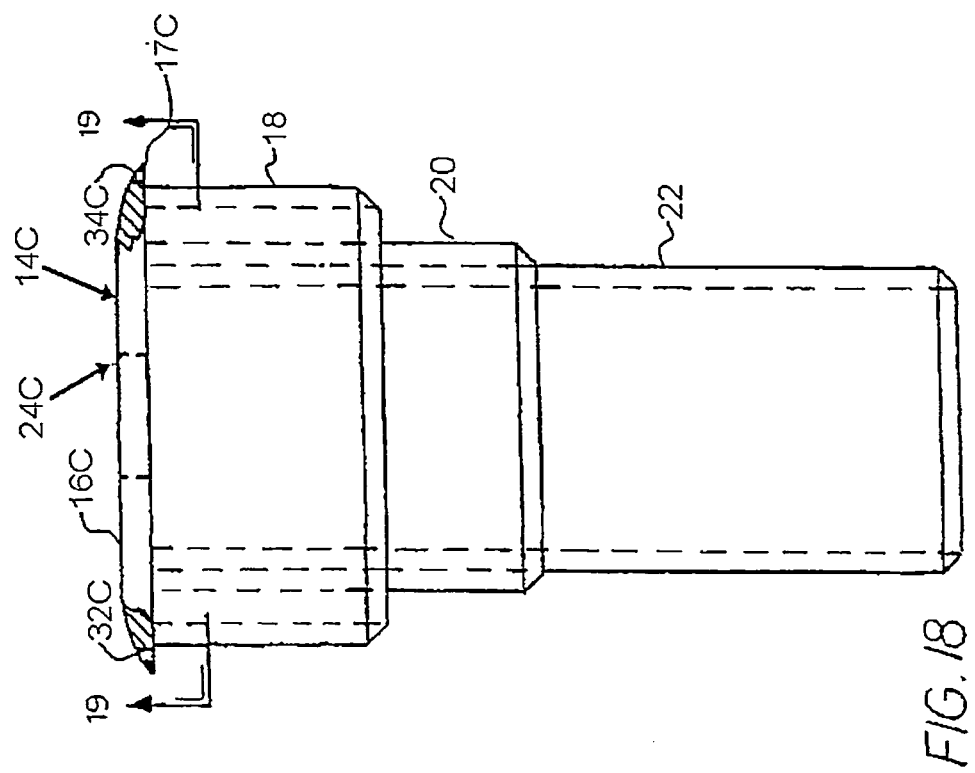

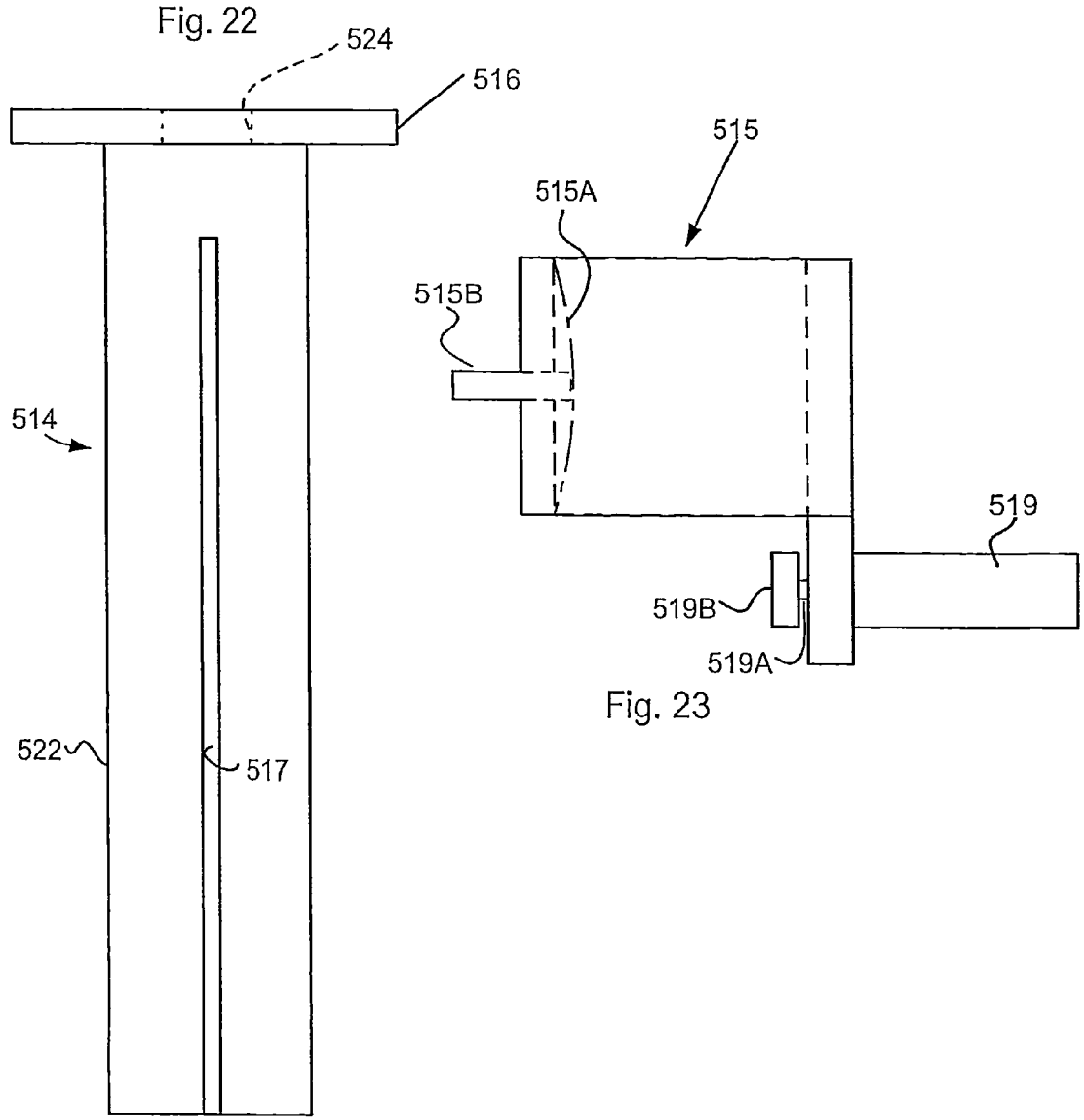

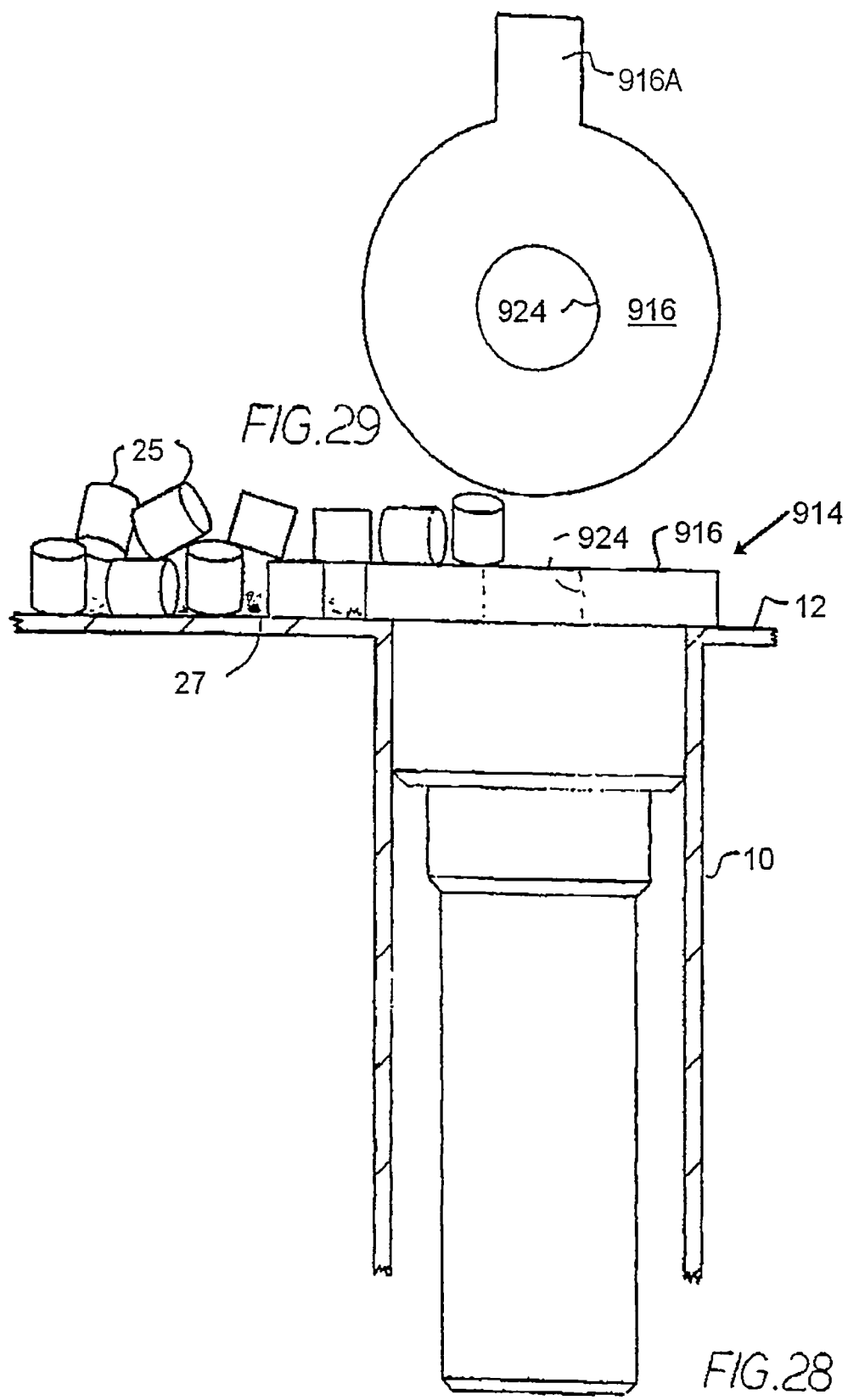

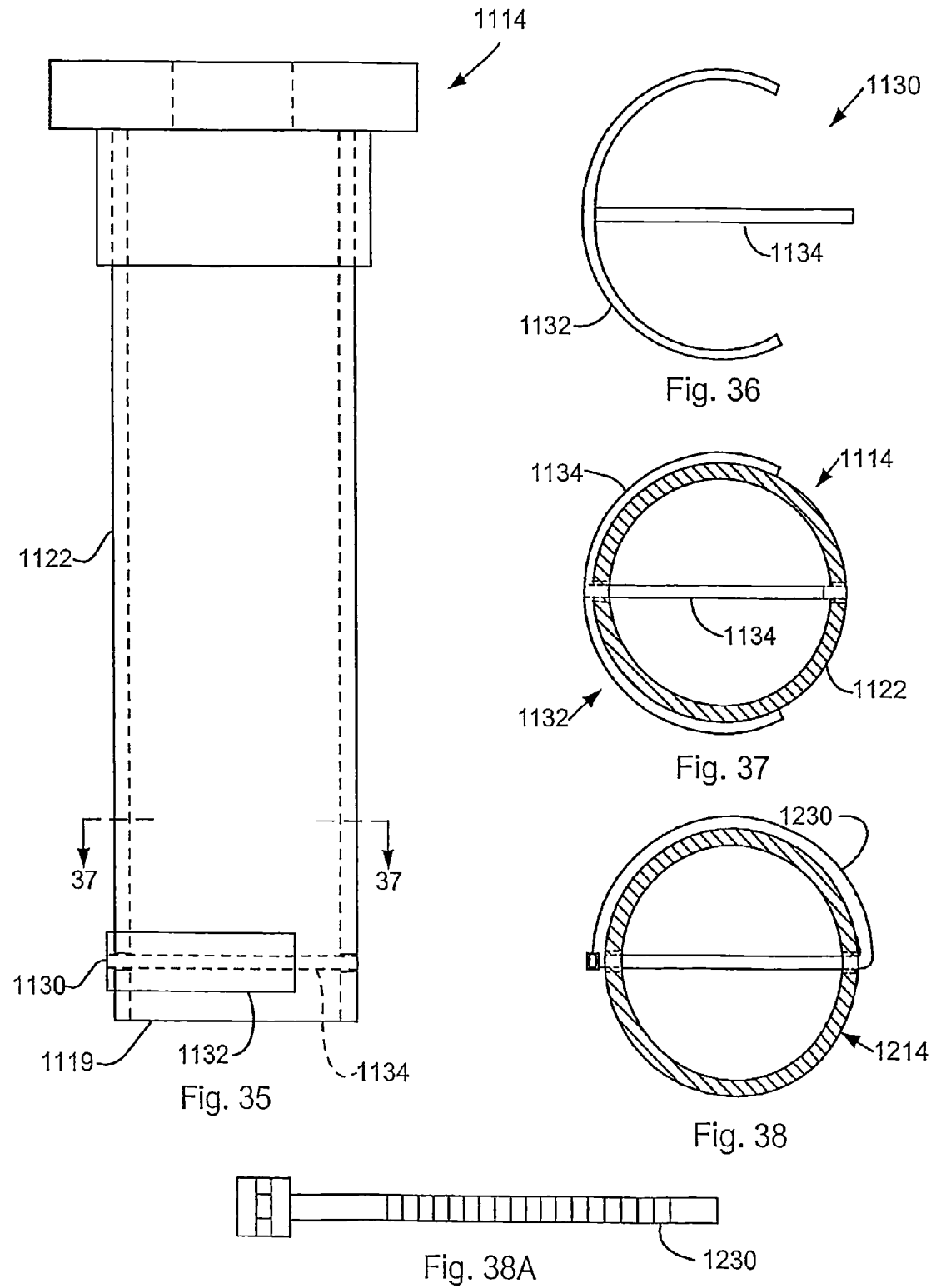

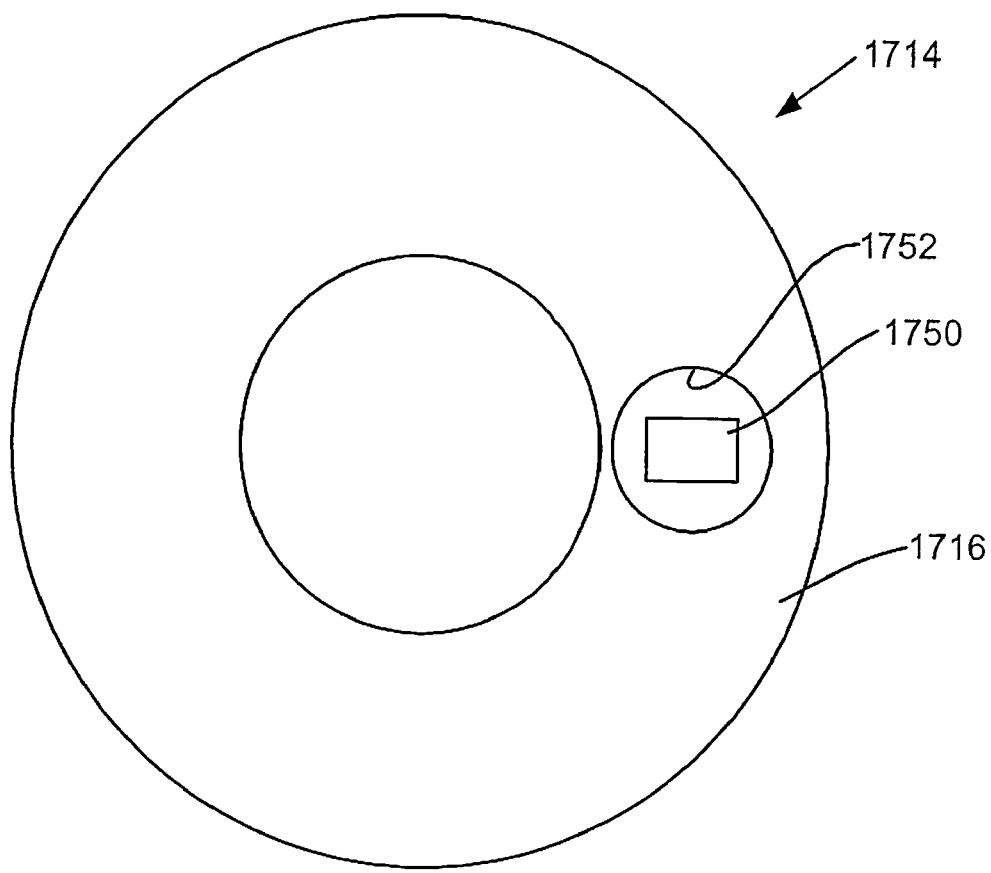
Fig. 49
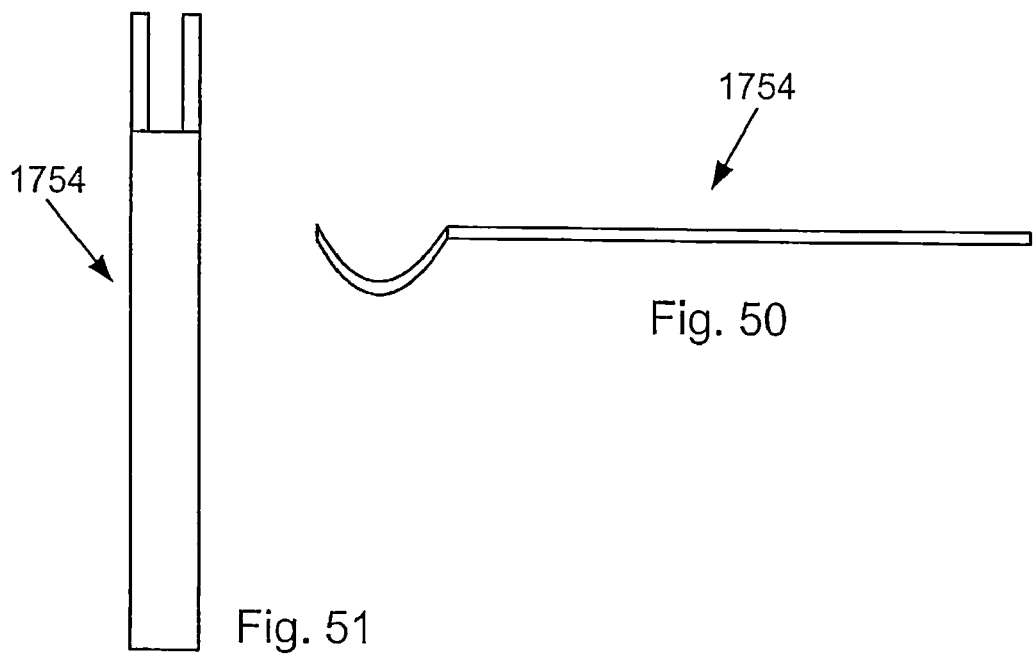
Fig. 51
Fig. 50

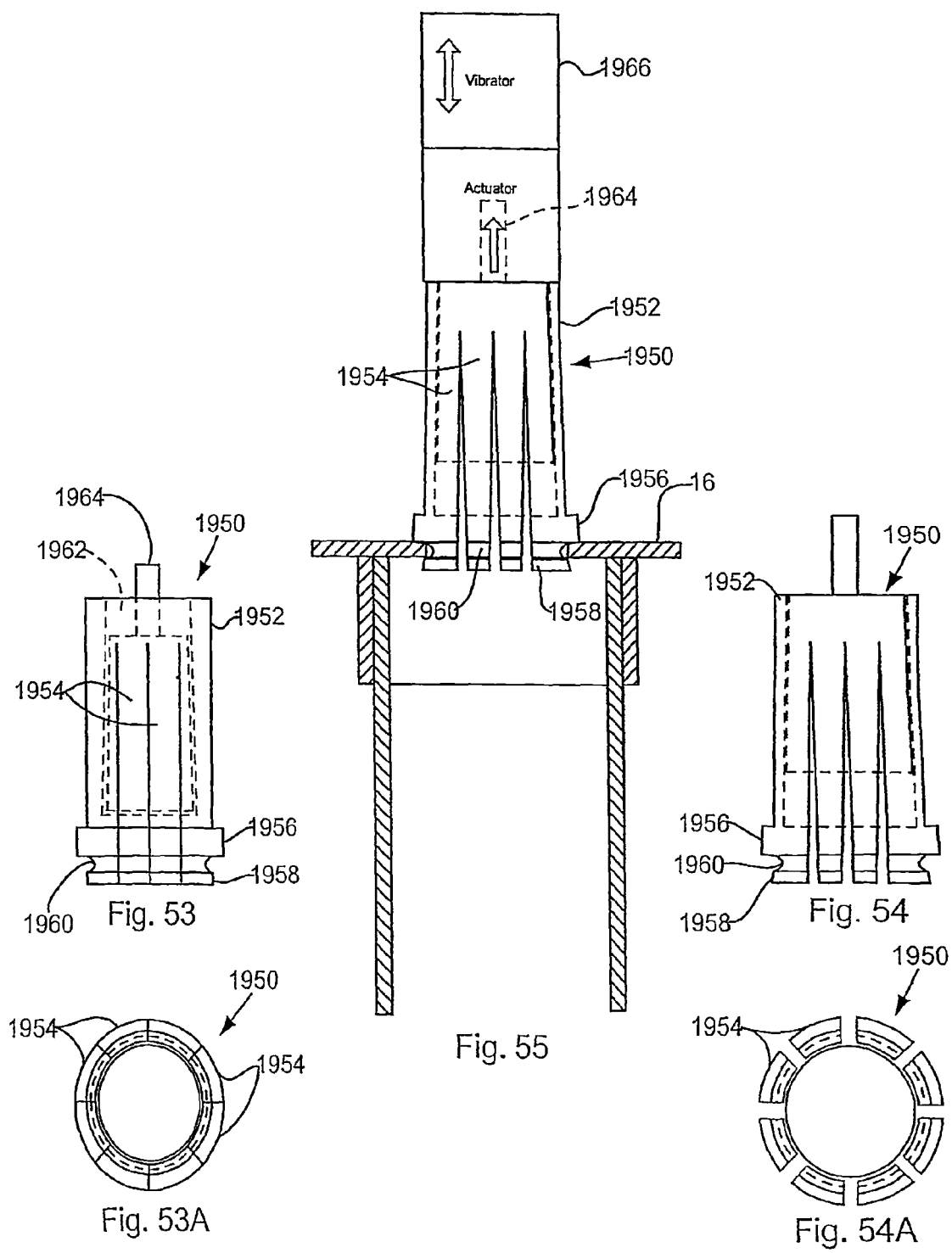

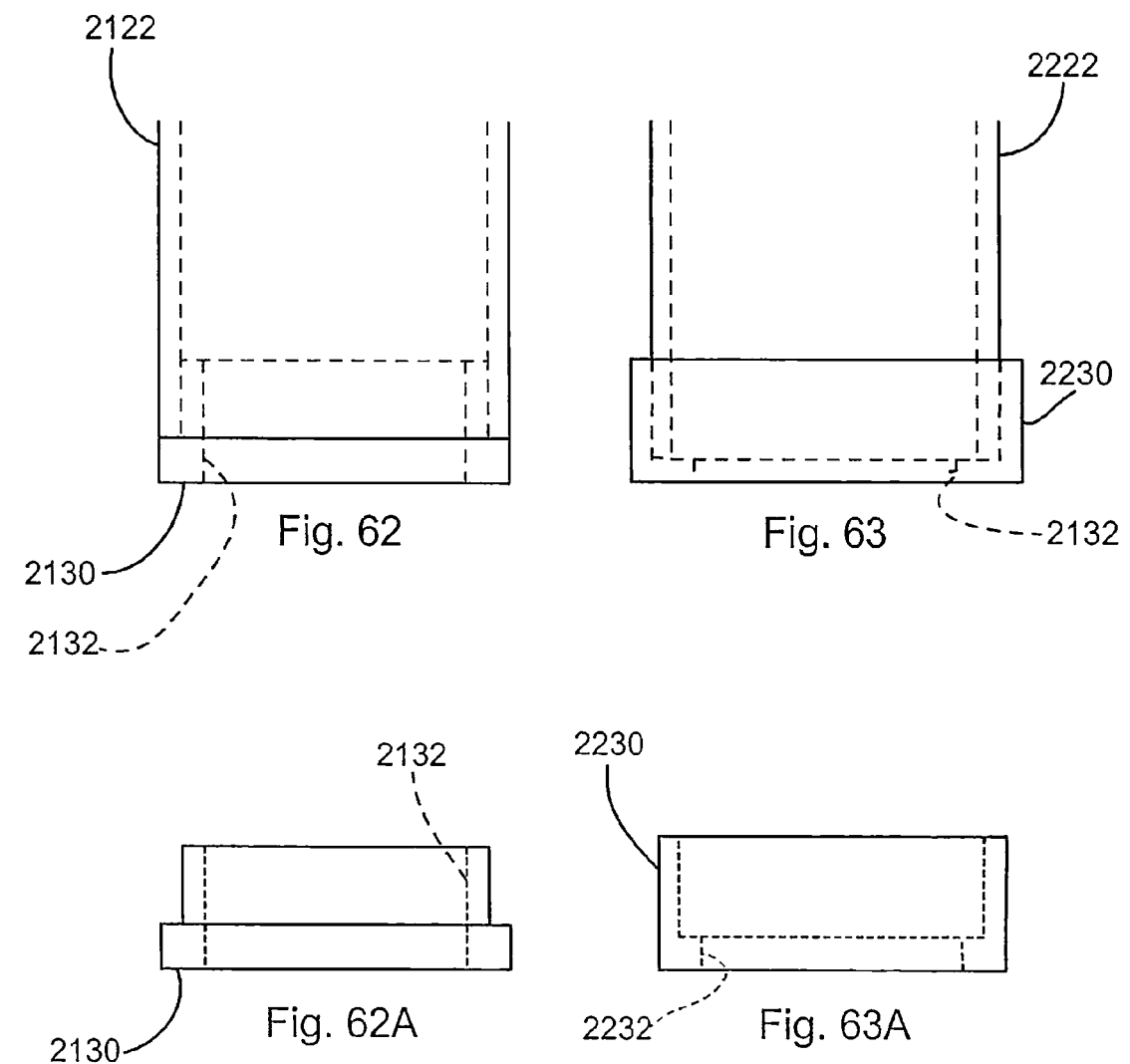

US 7,836,919 B2

DEVICE FOR LOADING CHEMICAL REACTOR TUBES

This application claims priority from U.S. Provisional Application Ser. No. 60/723,028 filed Oct. 3, 2005, which is hereby incorporated herein by reference.

BACKGROUND

The present invention relates to a sleeve for loading pellets, such as catalyst pellets, into chemical reactor tubes. Typically, the chemical reactor tubes are vertically arranged tubes which are held together by one or more tube sheets to form the basic structure of some chemical reactors. One tube sheet is generally located near the top of the reactor, with the reactor tubes extending downwardly from it. Additional tube sheets may be located near the bottom or middle of the tubes. References to the tube sheet herein generally relate to the upper tube sheet. The reactor tubes often are loaded with catalyst pellets, which assist in the chemical reaction. In order for the reactor to perform optimally, it usually is desirable to distribute the catalyst pellets evenly in the tubes.

When loading the tubes of a reactor vessel, the catalyst pellets may be very abrasive and may have a very strong tendency to bridge across the tube, stopping the further flow of pellets through the tube. It is desirable to load the catalyst pellets into the reactor vessel tubes at a controlled rate to eliminate bridging and to ensure uniform packing of the pellets within the tubes of the reactor vessel. Ideally, this controlled rate is such that the number of pellets simultaneously passing through any point is fewer than the number of pellets required to form a bridge. The rate usually is controlled by controlling the size of the opening through which the pellets pass into the reactor tube.

In typical loading procedures, the reactor tubes are filled to the top with catalyst, and then the catalyst is vacuumed out to the desired "outage" level, with the "outage" being the empty space within the reactor tube above the catalyst. This process is labor intensive and tends to degrade the catalyst, so it would be desirable to be able to load the catalyst pellets directly to a required "outage" level, such that pellets do not have to be vacuumed out or added after the loading in order to reach the desired outage level.

Sometimes, long loading sleeves are used so that, when the sleeve is filled and then is removed, the catalyst pellets fall to the desired height or outage. However, there often are problems with catalyst bridging in the sleeve as the sleeve is being removed, and there may be height limitations within the reactor which prevent the use of long loading sleeves.

SUMMARY

The present invention provides loading devices and methods that solve many of the problems described above.

BRIEF DESCRIPTION OF THE DRAWINGS

FIG. 1 is a schematic side view of a loading device for loading pellets into a chemical reactor tube made in accordance with the present invention, with the reactor tube in section;

FIG. 2 is a bottom view of the loading device of FIG. 1;

FIG. 3 is a top view of the loading device of FIG. 1;

FIG. 4 is a side view partially in section of another embodiment of a loading device for loading pellets into a tube, similar to the view of FIG. 1;

FIG. 5 is a bottom view of the loading device of FIG. 4;

FIG. 6 is a top view of the loading device of FIG. 4;

FIG. 15 is a bottom perspective view of another loading device that is similar to the loading device of FIG. 10 but with projections on the bottom surface of the tabs;

FIG. 16 is a top view of the loading device of FIG. 15 with a tubular extension attached;

FIG. 17 is a side view of the loading device of FIG. 16 shown mounted in a chemical reactor tube;

FIG. 18 is a side view partially in section of another loading device that is similar to FIG. 7, but with openings extending completely through the flange for collecting dust;

FIG. 19 is a view taken along line 19-19 of FIG. 18;

FIG. 20 is a top view of the loading device of FIG. 18;

FIG. 21 is a side view of another embodiment of a loading device for loading pellets into a chemical reactor tube made in accordance with the present invention, including a slit;

FIG. 22 is a top view of the loading device of FIG. 21;

FIG. 23 is a side view of a slide device for use in unloading pellets from the loading device of FIG. 21;

FIG. 28 is a side view of still another embodiment of a loading device made in accordance with the present invention, showing the loading device mounted in the chemical reactor tube;

FIG. 29 is a top view of the loading device of FIG. 28;

FIG. 35 is a side view of another embodiment of a loading device made in accordance with the present invention, showing a clip obstruction at the bottom of the loading device;

FIG. 36 is a plan view of the clip of FIG. 35;

FIG. 37 is a view along line 37-37 of FIG. 35;

FIG. 38 is a view of an alternative embodiment, similar to that of FIG. 37, but where the clip obstruction has been replaced with a plastic tie wrap obstruction;

FIG. 38A is a view of the tie wrap of FIG. 38 before it is inserted into the loading device;

FIG. 49 is a plan view of the loading device of FIG. 46;

FIG. 50 is a side view of a fork tool used to pull on the nub to tighten the noose of FIGS. 46-48;

FIG. 51 is a top view of the fork tool of FIG. 50;

FIG. 53 is a schematic side view of a removal device for removing the loading devices out of the reactor tubes, shown in the relaxed position;

FIG. 53A is a bottom view of the removal device of FIG. 53;

FIG. 54 is a schematic side view of the removal device of FIG. 53, shown in the actuated position;

FIG. 54A is a bottom view of the removal device of FIG. 54;

FIG. 55 is a schematic side view of the removal device of FIG. 53 installed in a loading device, with the loading device being shown in section;

FIG. 62 is a side view of the bottom end of a loading device including an obstruction made in accordance with the present invention;

FIG. 62A is a side view of the insert of FIG. 62;

FIG. 63 is a side view similar to that of FIG. 62 but of an embodiment in which the of the obstruction is formed by a cap that fits over the bottom of the tubular extension;

FIG. 63A is a side view of the cap of FIG. 63;

DESCRIPTION

Figure 3A:
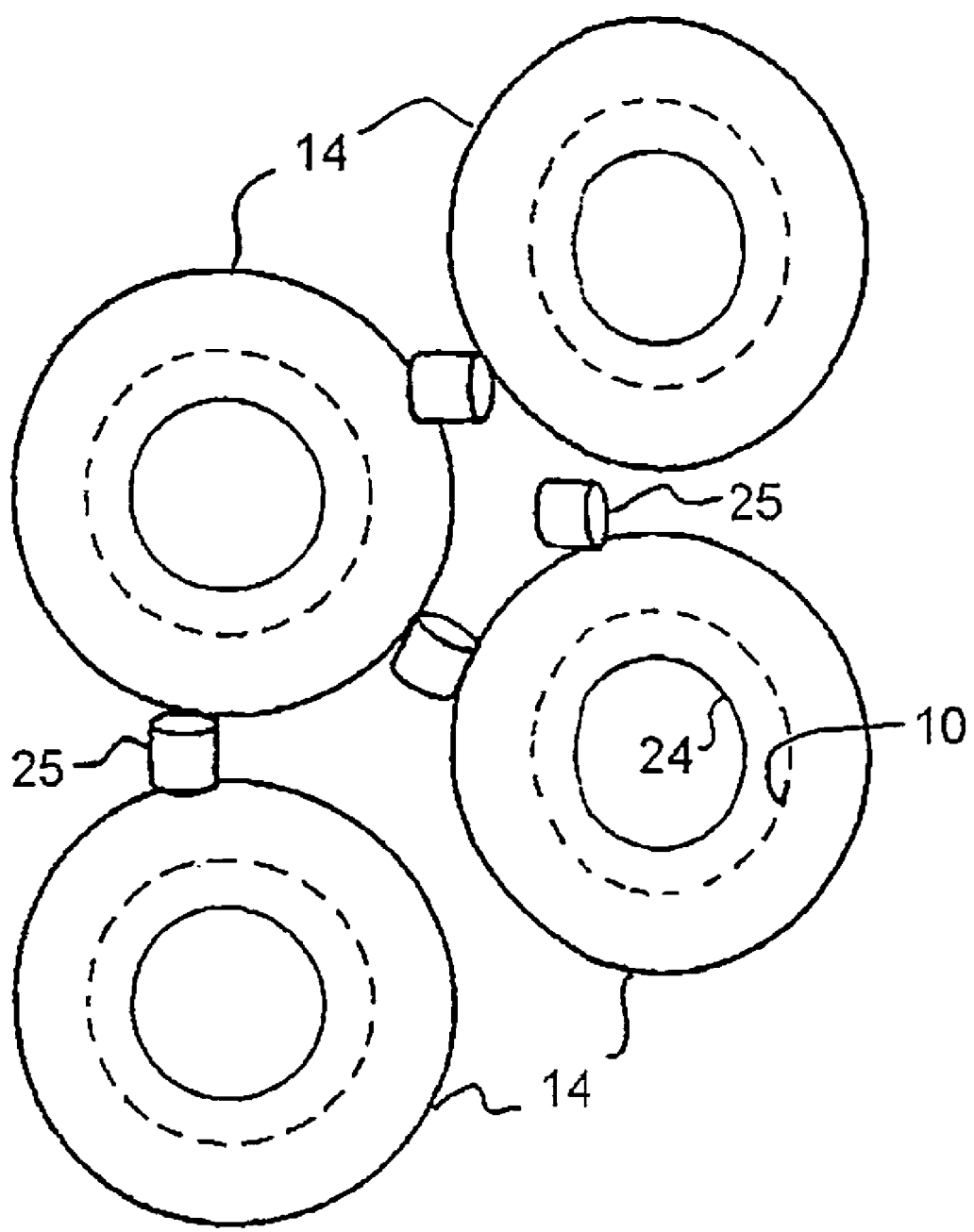
FIG. 3A is a top view of a plurality of the loading devices of FIGS. 1-3 inserted into their respective reactor tubes and showing some catalyst pellets.

FIG. 1 shows a portion of a chemical reactor tube 10 extending downwardly from a tube sheet 12. A loading device 14 for loading pellets has been inserted into the tube 10. The loading device 14 includes an upper flange portion 16, which rests on the tube sheet 12 and is slightly larger in diameter than the inside diameter of the tube 10, so the loading device 14 is suspended from the flange 16, which rests on the tube sheet 12. The flange 16 defines a central opening 24 at a first height and tapers downwardly from its central opening 24 to its outer edge 17, which is at a second, lower height. As can be seen better in FIGS. 2 and 3, the flange 16 is circular. This particular flange 16 has a maximum height of 2 mm above the tube sheet 12 adjacent to the central opening 24 and tapers down to a thin edge 17. This particular central opening 24 has a diameter of 23.8 mm. The central opening 24 is larger than the smallest dimension of the pellets 25 (See FIG. 3A) to be loaded into the tube 10. The central opening 24 is also smaller than the rest of the passageway below it, so that pellets entering through the central opening 24 flow freely through the loading device until the level of the pellets reaches the bottom of the loading device 14.

The height of the flange 16 may vary, depending upon the circumstances. The thin edge 17 and the rounded, tapered surface from the thin edge 17 to the central opening 24 make it very easy to sweep pellets up from the tube sheet 12 onto the flange 16 and into the opening 24.

In cases in which the flange 16 is made thin, in order to facilitate the movement of pellets from the tube sheet 12 onto the flange 16, it is preferable that the maximum height of the flange 16 above the tube sheet 12 be less than 25% and more preferable that it be less than 10% of the smallest dimension of the pellets 25 to be loaded in to the reactor tube 10, making it easy to sweep pellets 25 up from the tube sheet 12 onto the flange 16.

The loading device 14 also includes an outer tubular sleeve portion 18 that extends downwardly from the flange 16. The outer tubular sleeve portion 18 has an outer diameter that is slightly less than the diameter of the reactor tube 10 so it fits inside the reactor tube 10 while the flange 16 suspends the loading device 14 from the tube sheet 12. There is also an inner tubular sleeve portion 20 that is spaced inwardly from the outer sleeve portion 18. In this embodiment, the inner sleeve portion 20 extends downwardly such that the bottom of the inner sleeve portion 20 is below the bottom of the outer sleeve portion 18. In this embodiment, the outer surface of the bottom edges 19, 21 of the outer and inner sleeve portions 18, 20 respectively are tapered inwardly to make it easier to insert the loading device 14 into the tube 10.

A tubular sleeve extension 22 is inserted into the inner sleeve portion 20. In this embodiment, the sleeve extension 22 is a regular off-the-shelf piece of polyvinyl chloride (PVC) tubing, which has been inserted into the inner sleeve portion 20 until it touches the flange 16. The sleeve extension 22 may be secured to the inner sleeve portion 20 or to the flange 16 by any of a number of different means. For instance, the sleeve extension 22 may be held in place by chemical bond, friction, glue, adhesives, or other known means. In this embodiment, the extension 22 is glued to the inner surface of the inner sleeve portion 20. To make it easier to install the extension 22, the inner surface of the inner sleeve 20 may be tapered so that it has a wider diameter at the bottom than at the top. Once the extension 22 is secured, it becomes part of the inner sleeve portion 20, effectively lengthening that inner sleeve portion 20 and reducing its inside diameter.

The inner surface of the sleeve extension 22 defines a passageway in communication with the inlet opening 24, and its bottom edge defines an outlet opening, so the pellets flow through the inlet opening 24, through the passageway defined by the sleeve 22, and out the bottom of the sleeve 22.

While this embodiment uses an extension 22, it would also be possible to use the loading device 14 without an extension, making the inner sleeve portion 20 any desired length, as needed. Also, it is not necessary to have both inner and outer sleeve portions. In particular, if the reactor tube 10 has a small inside diameter, it would be desirable to eliminate the outer sleeve portion 18. It should be noted that the flange 16 of this embodiment extends inwardly beyond the inside diameter of the inner sleeve portion 20 and beyond the inside diameter of the extension 22 so that the inside diameter of the central opening 24 is smaller than the inside diameter of the inner sleeve portion 20 and of its extension 22. This reduces the opportunity for bridging in the loading device 14 at least until the level of the pellets in the reactor tube reaches the bottom of the loading device 14.

When the loading device 14 is inserted into the reactor tube 10, the inner and outer sleeve portions 20, 18 and the tubular sleeve extension 22 extend downwardly into the tube 10. The tubular sleeve extension 22 is cylindrical, so its internal cross-sectional area at every elevation is the same. Since the tubular sleeve extension 22 has a smaller inside diameter than the reactor tube 10, when the loading device 14 is filled with catalyst or other pellets and is then removed from the reactor, the pellets that are inside the loading device 14 fall into the larger diameter reactor tube 10, leaving a gap or outage (an empty space) at the top of the reactor tube 10. The outage is the distance between the topmost pellets that have been loaded into the reactor tube 10 and the top surface of the tube sheet 12. The length of the sleeve extension 22 (or of the inner sleeve portion 20 if an extension is not used) may be adjusted, or the inner diameter of the sleeve extension 22 or of the inner sleeve portion 20 may be adjusted depending on the outage requirements for a particular application, such that when the loading device 14 is removed and the pellets inside the loading device 14 fall out into the reactor tube 10, the desired outage is reached. Also, by allowing the diameter of the opening 24 to be smaller than the inside diameter of the tubular sleeve extension 22, this design gives the designer flexibility in selecting an inside diameter for the sleeve extension 22 (or for the sleeve 20 if an extension is not used) to create any desired outage.

In order to load pellets 25, such as catalyst, into the reactor tube 10, the pellets 25 are poured onto the tube sheet 12 after loading devices 14 have been inserted into the tubes 10 to be loaded. The pellets 25 are then swept or dropped by hand, brushed, or moved by other means toward the openings 24 in the flanges 16 of the loading devices 14. The size of the opening 24 is designed to limit the number of pellets 25 that can go through the opening 24 at the same time in order to help ensure that the pellets 25 fall into the tube 10 in an orderly manner without bridging to fill the tube 10 evenly. In this embodiment, the outer edge 17 of the flange 16 has a substantially quarter-rounded shape. The rounded, tapered edge 17 provides a smooth transition from the tube sheet 12 to the opening 24, making it easier to sweep pellets 25 up onto the flange and into the opening 24. (Other downward tapers could be used instead, such as a straight line taper.) It can be seen in FIG. 3A that there is a substantial distance between the flanges 16, large enough to allow whole pellets 25 to fall between the flanges 16 onto the tube sheet 12. This provides a substantial space for dust and broken pellets to accumulate on the tube sheet 12, where they can be collected, and helps prevent the dust and broken pellets from entering the reactor tubes 10. The top surfaces of the flanges 16 may be flat or tapered upwardly or downwardly. A downward taper of the top surface of the flange 16 also reduces the likelihood that dust and broken pellets will reach the openings 24 and enter the reactor tubes.

FIGS. 4-6 show another loading device 14A that is very similar to the loading device 14 of FIGS. 1-3. The only difference is that this loading device has windows 26 in the inner and outer sleeve portions 20, 18. The windows 26 are holes or transparent areas located near the top of the sleeve portions 18, 20 just below the flange 16. In this case, there are four equally spaced windows 26 in the outer sleeve portion 18 and four equally spaced windows 26 in the inner sleeve portion 20. The windows 26 in the outer sleeve portion 18 are aligned with the windows in the inner sleeve portion 20, allowing an observer to see into the interior of the loading device 14A to ensure that the tubular extension 22 has been inserted all the way to the flange 16. The windows 26 also can function as openings through which to add adhesive to secure the extension 22 to the inner sleeve 20. There may be more or fewer windows 26 if desired. Otherwise, this loading device 14A functions in the same manner as the first loading device 14.

Figure 8:
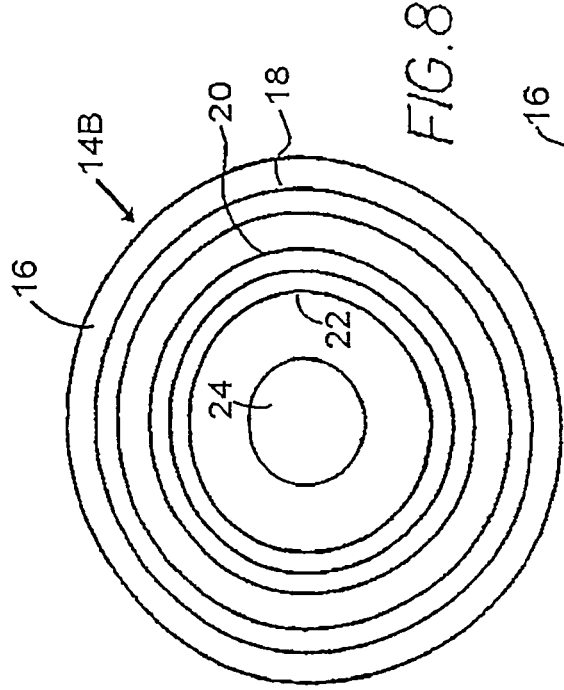
FIG. 8 is a bottom view of the loading device of FIG. 7.
Figure 9:
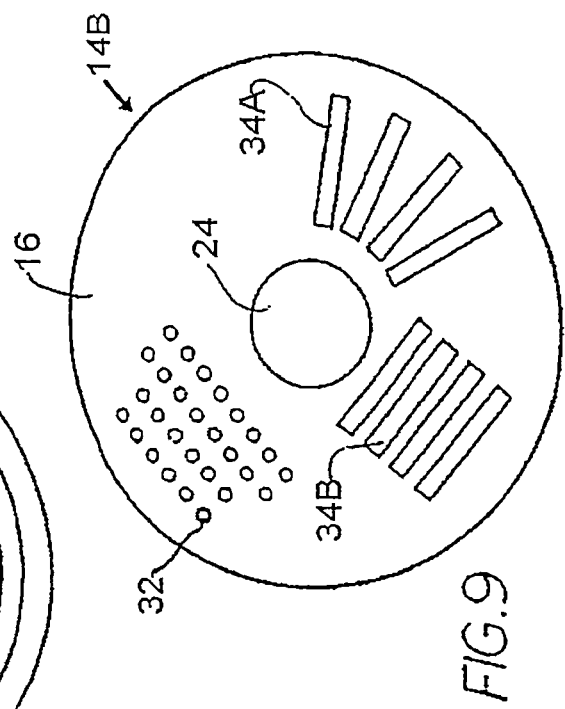
FIG. 9 is a top view of the loading device of FIG. 7.
Figure 7:
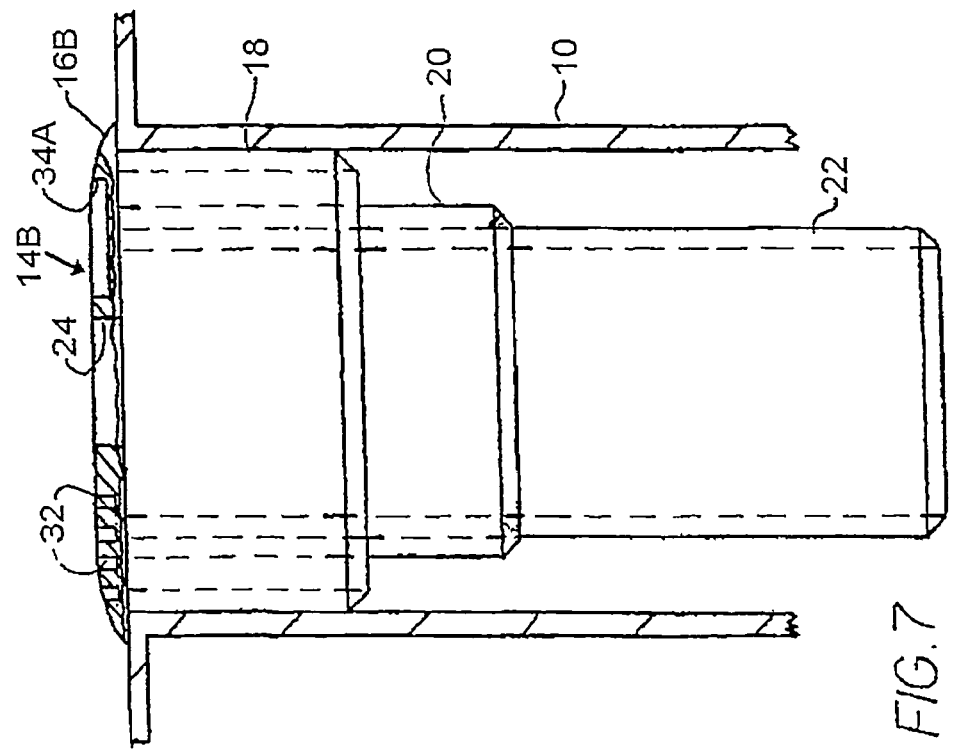
FIG. 7 is a side view partially in section of another embodiment of a loading device for loading pellets into a tube, similar to the view of FIG. 1.

FIGS. 7-9 show another embodiment of a loading device 14B. Here, the flange 16B defines dust-receiving recesses 32, 34A, 34B of various shapes, for receiving dust. The dust-receiving recesses 32, 34A, 34B extend downwardly from the top surface of the flange 16A, but they do not extend completely through the flange 16. They collect dust and fine particles as the whole pellets 25 are being swept up, dropped, or otherwise moved toward the opening 24. The dimensions of the recesses are small enough to prevent the whole pellets 25 from falling in. As best shown in FIG. 9, this loading device 14B uses a combination of small diameter cylindrical or pit-type recesses 32, elongated recesses 34A running generally radially, and elongated recesses 34B running generally perpendicular to the radius of the flange 16B. Of course, other flanges could have only the pit-type recesses 32, only radial elongated recesses 34A, only perpendicular elongated recesses 34B, any combination thereof, or various other shapes. In addition, the recesses could extend across the entire flange or there could be areas where there are no recesses, as shown in FIG. 9. These loading devices 14B are used in the same manner as described above, except that, after the pellets 25 are loaded into the tubes 10, the dust is vacuumed from the recesses 32, 34A, 34B before removing the loading devices 14B from the reactor tubes 10, or the loading devices 14B are removed and are placed carefully into bags in order to contain and remove the dust.

Figure 9A:
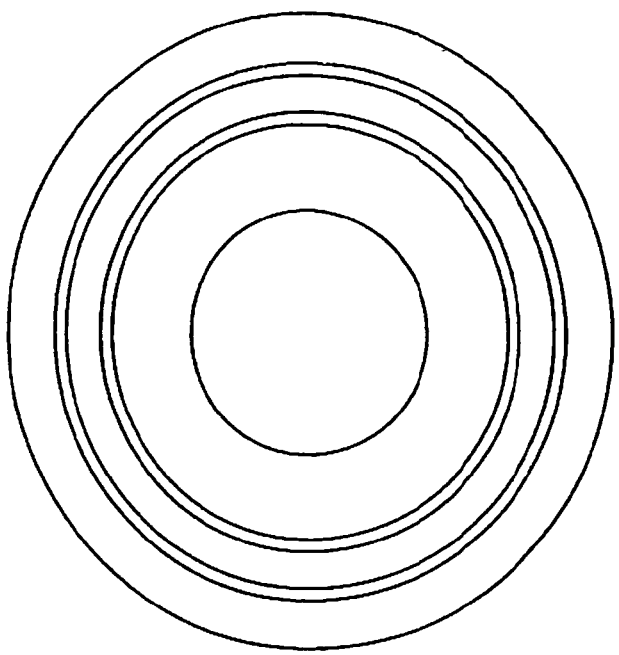
FIGS. 9A-9E show different embodiments with various configurations of recesses in the top surface of the flange.
Figure 9B:
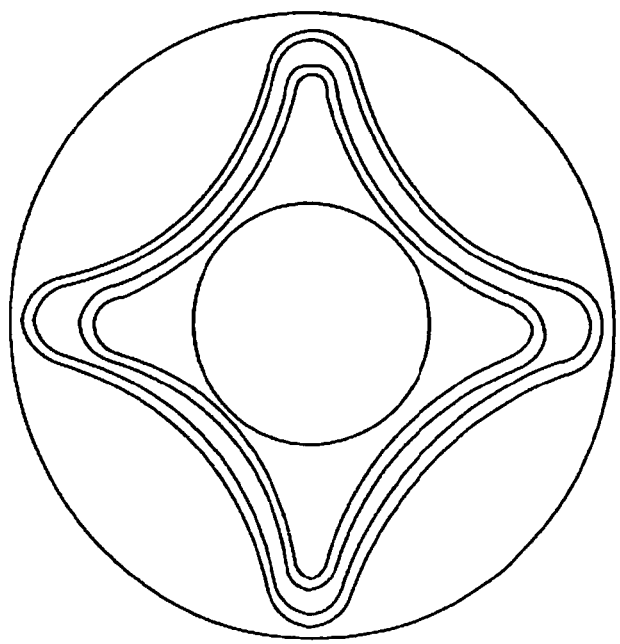
Figure 9C:
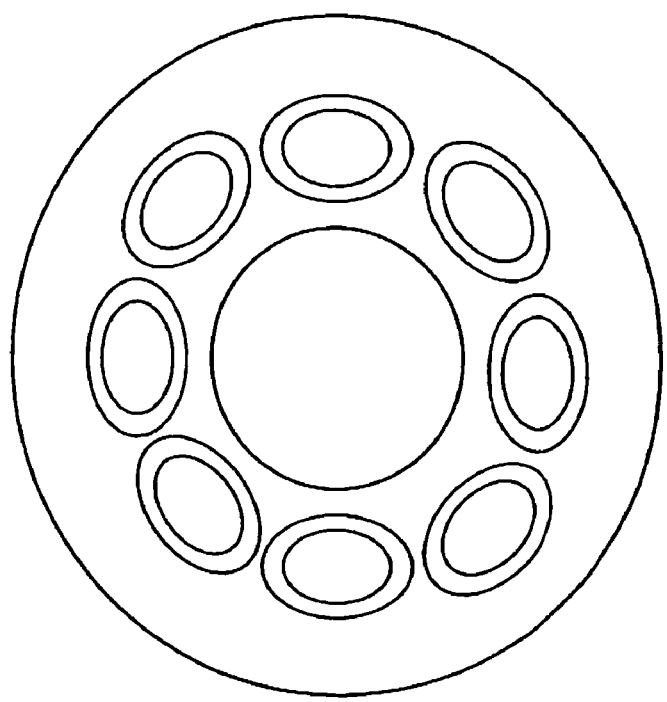
Figure 9D:
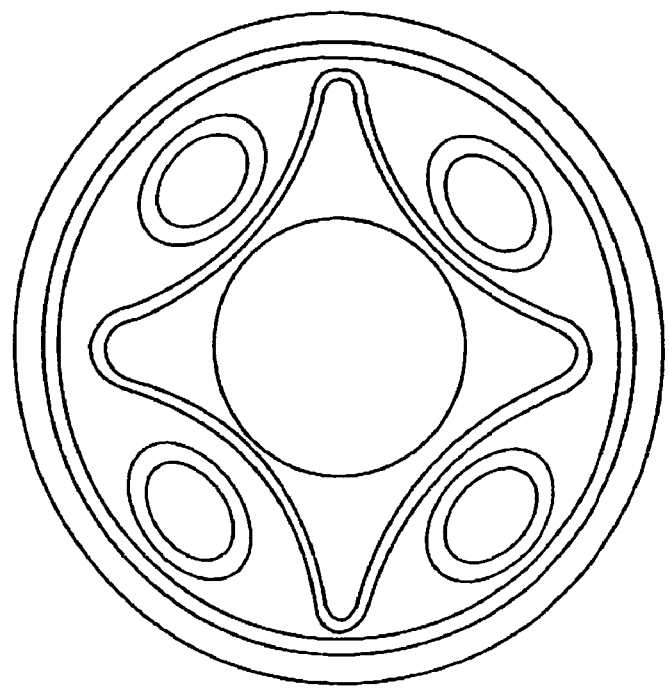
Figure 9E:
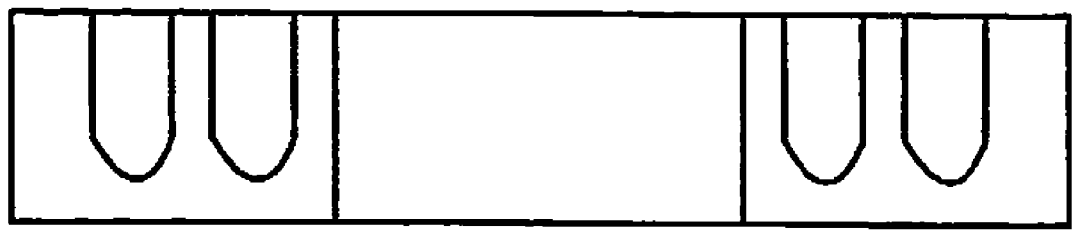

FIGS. 9A-9E show different embodiments with various configurations of recesses in the top flange for receiving dust. FIG. 9A shows two concentric circular recesses surrounding the opening. FIG. 9B shows two continuous recesses, one inside the other, surrounding the opening. FIG. 9C shows several oval recesses evenly-spaced around the flange. FIG. 9D shows a combination of oval recesses with one continuous recess encircling the opening. FIG. 9E is a section view showing the depth of the recesses of FIG. 9B. The depth is generally the same for all the recesses of FIGS. 9A-D.

Figure 10:
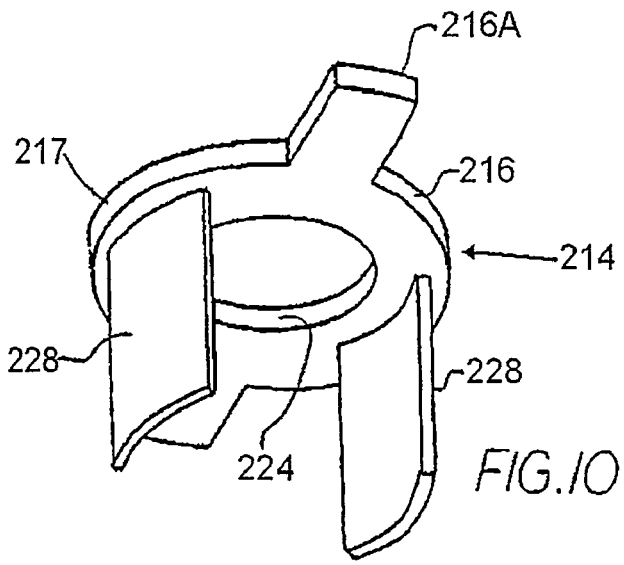
FIG. 10 is a bottom perspective view of another embodiment of a loading device made in accordance with the present invention.
Figure 11:
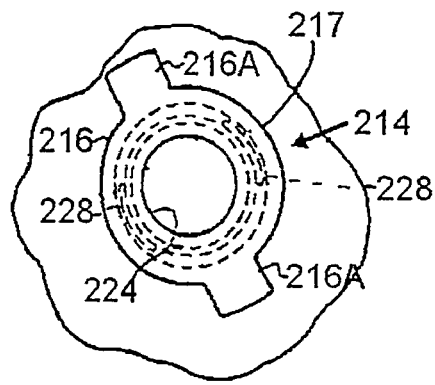
FIG. 11 is a top view of the loading device of FIG. 10 with a tubular extension added.
Figure 12:
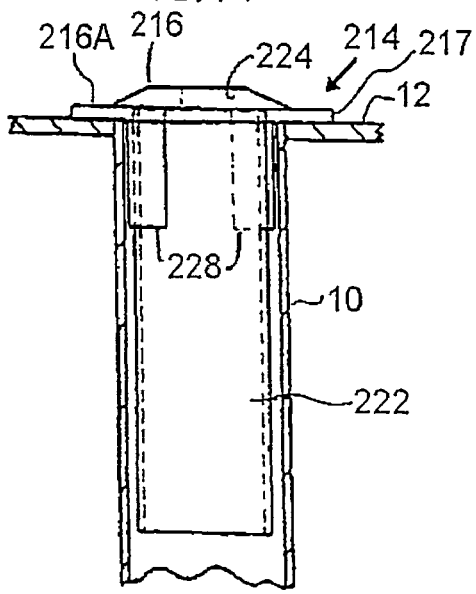
FIG. 12 is a side section view through the reactor tube, showing the loading device of FIG. 11 mounted in the reactor tube.

FIGS. 10-12 show another embodiment of a loading device 214 for loading pellets. This loading device 214 has a very narrow flange 216 with a generally circular shape and including two opposed, outwardly-projecting tabs 216A. In addition, it has downwardly projecting arcuate cross-section sleeve portions 228 instead of the circular cross-section sleeve portions of the previous embodiments. As best shown in FIG. 12, a tubular extension 222 is inserted inside the sleeve portions 228 and is secured to them with a chemical bond, adhesive, or the like. The sleeve portions 228 act as a spacer between the reactor tube 10 and the tubular extension 222, helping to center the tubular extension 222 within the reactor tube 10. In this embodiment, the central portion of the top surface of the flange 216 is convex, so that particles falling on the flange 216 tend to fall away from the opening 224. This helps prevent dust from falling into the central opening 224. The tab portions 216A and the outer edge 217 of the flange 216 are very thin, as in the flange of the first embodiment, and thus do not present any barrier to the catalyst pellets 25 as they are being swept up onto the flange 216 toward the central opening 224.

Figure 13:
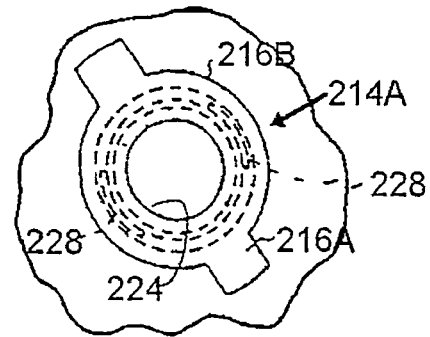
FIG. 13 is a top view of an alternative loading device that is similar to that of FIG. 11, but with the top surface having a different taper.
Figure 14:
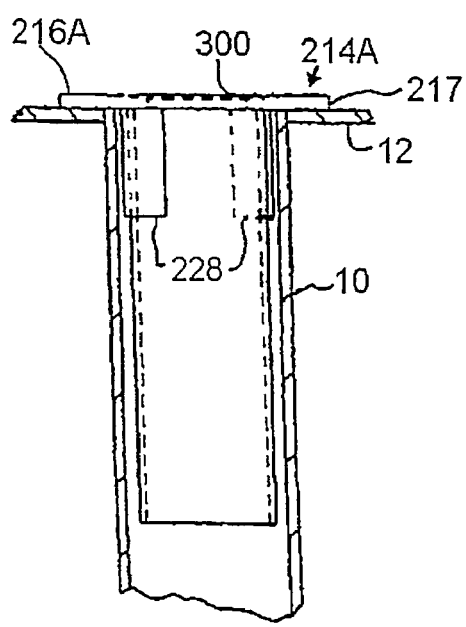
FIG. 14 is a side section view through the reactor tube, showing the loading device of FIG. 13 mounted in the reactor tube.

Another embodiment of a loading device 214A, shown in FIGS. 13 and 14, has the same bottom view as the loading device 214 of FIG. 10, but it has a slightly concave top surface 300, which makes it easier for the pellets 25 to be swept into the central opening 224. As in the previous embodiment, the tab portions 216A and the edge of the flange 216B are thin in order to make it easy for pellets to be swept up onto the flange 216B toward the central opening 224.

Figure 12A:
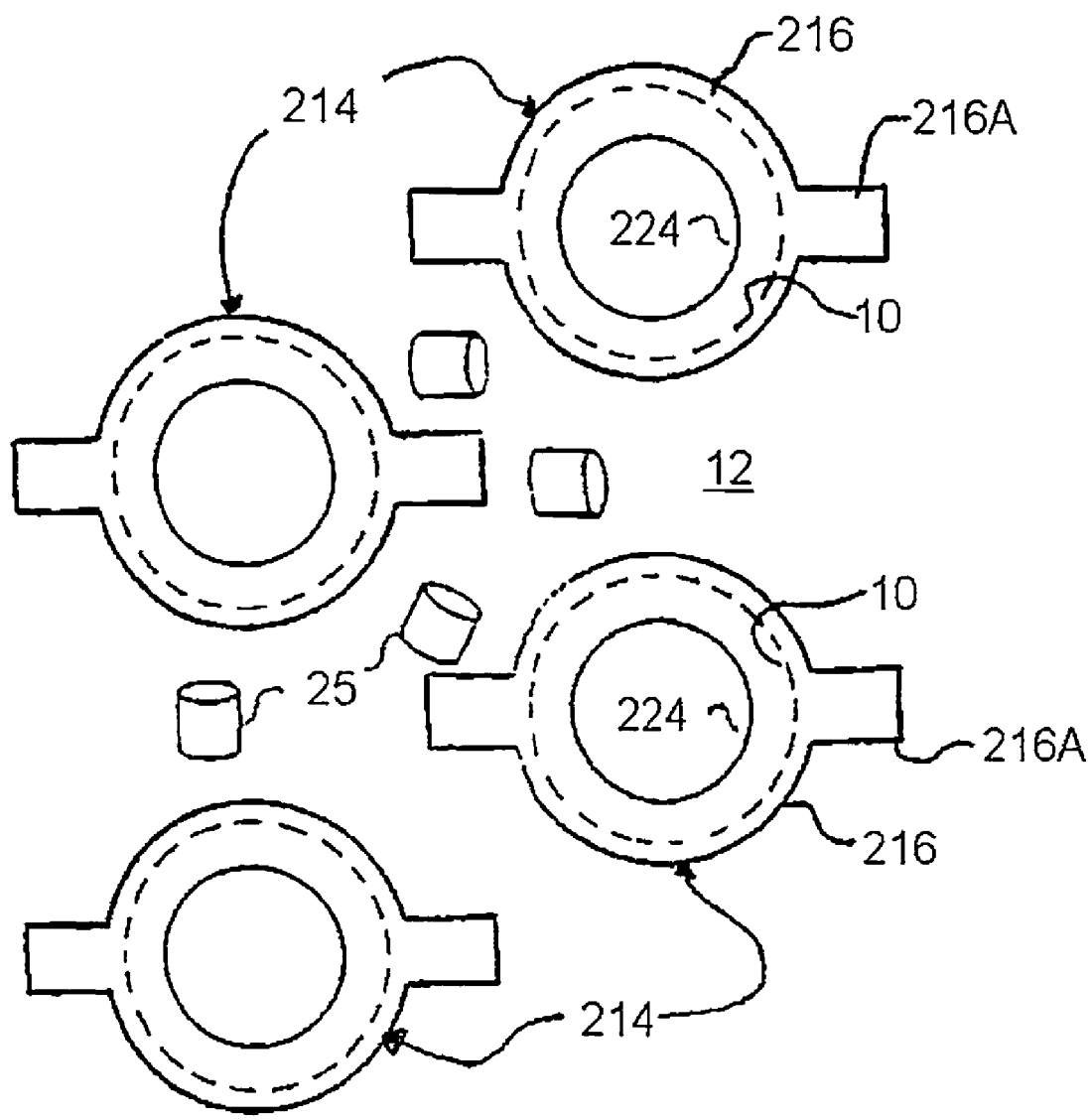
FIG. 12A is a top view of a plurality of the loading devices of FIG. 12 inserted into their respective reactor tubes.

FIG. 12A is a top view showing the spacings between the loading devices 214 when they are inserted into their respective reactor tubes 10. Again, the spaces between the flanges 216 are large enough to permit whole pellets 25 to fall between the flanges 216 and onto the tube sheet 12, providing a substantial surface area for collecting dust and broken pellets. It can be seen in this embodiment that the diameter of the circular portion of the flange 216 is just slightly larger than the inside diameter of the reactor tube 10, and the tab portions 216A of the flange 216 further ensure that the loading device 214 remains suspended from the tube sheet 12 instead of falling into the reactor tube 10.

FIGS. 15-17 show another loading device 414 with a flange 416 similar to the flange 216 of FIG. 10, but having three tabs 416A with downwardly projecting bumps or projections 440, which space the flat bottom surface portion of the flange 416 above the tube sheet 12. This arrangement may be useful if there are rough portions around the tops of the reactor tubes 10. FIGS. 16 and 17 show a tubular extension 422 adhered to the arcuate sleeve portions 428.

FIGS. 18-20 show a loading device 14C that is similar to the loading device 14B of FIGS. 7-9. However, unlike the loading device 14B, where there are recesses that do not extend completely through the flange, this loading device 14C defines dust holes 32C and dust slots 34C that extend completely through the flange 16C. In this case, the holes 32C and slots 34C are limited to the area of the flange 16C between the outer tubular sleeve portion 18 and the outer edge 17C of the flange 16C so the dust that falls through the holes 32C and slots 34C will land on the tube sheet 12 and will not fall into the reactor tube 10. Again, the dimensions of the holes and slots 32C, 34C are small enough to prevent whole pellets 25 from falling through the holes 32C and slots 34C. The holes and/or slots could extend around the entire circumference of the flange 16C, or there could be areas where there are no holes or slots, as in FIGS. 19 and 20.

Figure 23A:
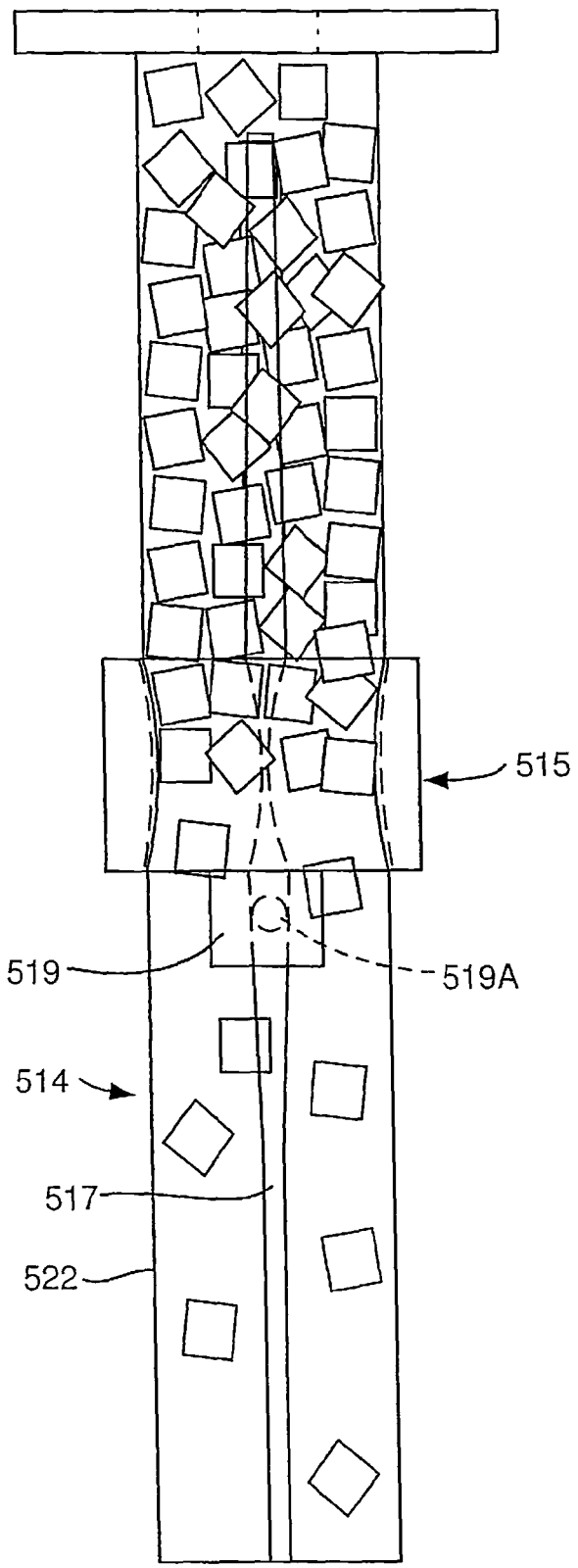
FIG. 23A is a side view of the loading device of FIG. 21 with the slide device of FIG. 23 being used.

FIGS. 21-23A show a loading device 514 with a slit 517, which may accommodate a slide or expander mechanism 515, which is used to unload any bridged pellets that have been trapped in the loading device 514. The slit 517 extends from the bottom edge of the sleeve 522 upwardly to the top of the loading device 514 and has a width that is smaller than the smallest dimension of the pellets to be loaded. The expander 515 includes an upper portion, which includes a spring 515A with a screw adjustment 515B, and a lower portion, which includes a handle 519, a spreader 519A, and an enlarged end 519B on the spreader 519A. The upper portion is intended to axially squeeze the tubular extension 522 to reduce the width of the slit 517, and the lower portion is intended to open the slit 517, with the spreader 519A having a greater width than the nominal width of the slit 517 in order to wedge the slit open, as shown in FIG. 23A.

The loading device 514 is used in the same manner as the devices that have already been described. It is inserted in to the chemical reactor tube 10, with its flange 516 resting on the tube sheet. Pellets pass through the top opening of the loading device 514 and through the sleeve 522 into the reactor tube 10. Eventually, the pellets fill the loading device 514. Then, the loading device 514 is removed from the reactor tube. If any pellets remain in the loading device 514, the expander 515 is used to unload those pellets. The expander 515 is placed over the bottom of the sleeve 522, with the spreader 519A entering the bottom of the slit 517. As the expander 515 is slid upwardly along the tubular extension 522, it increases the inside diameter of the sleeve 522 at the height of the spreader 519A and alleviates bridging at that height, allowing the pellets at that level to fall out of the loading device 514, while squeezing together the sleeve 522 above that level, thereby preventing pellets above that level from falling out and creating a new bridge. Thus, as the expander 515 is slid upwardly, it gradually releases any bridged pellets in the loading device 514, without providing the opportunity for additional bridging.

To use the expander 515, a worker would first remove the loading device 514 from the reactor tube 10 (after the pellets 25 have been loaded into the tube 10). The worker would then visually inspect the loading device 514 to see if there are any pellets 25 remaining in it. If the loading device 514 is empty (i.e. no bridging), then there is no need to use the expander 515. However, if there is bridging in the loading device 514, the worker would slide the expander 515 onto the bottom end of the loading device 514, with the spreader 519A inside the slit 517 and the enlarged end 519B inside the tubular extension 522, and slowly slide the expander 515 upwardly from the bottom position. As the expander 515 advances upwardly (as shown in FIG. 23A), it temporarily makes the diameter of the tubular portion 522 larger at its particular elevation, which allows the bridged catalyst at that elevation to fall down out of the loading device 514 while pinching together the tubular extension 522 above that elevation to prevent a slug of pellets 25 from falling down and re-bridging in the loading device 514 or the reactor tube 10. It may be desirable to empty the bridged pellets 25 into a reactor tube 10 or into a storage container, depending upon the situation.

If the dimensions and other characteristics of the pellets being loaded are such that the pellets regularly bridge within the sleeve 522, it may be desirable to lift the loading device 514 full of pellets out of the reactor tube, leaving a desired level of pellets within the tube, and then use the expander 515 to empty the pellets into a bin for reuse elsewhere. Alternatively, the expander 515 may be used to empty the pellets from the loading device 514 into the reactor tube 10 which it had been loading, to ensure that the full charge of pellets in the loading device 514 is loaded into that tube 10.

Figure 24:
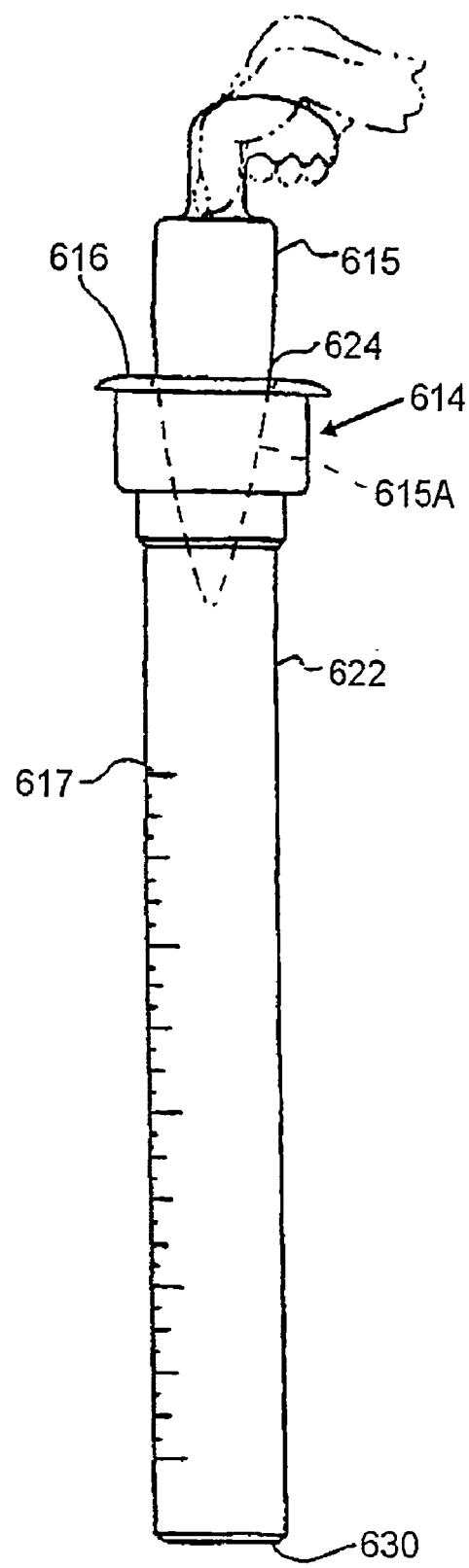
FIG. 24 is a side view showing a vibration device inserted into a loading device made in accordance with the present invention.

FIG. 24 shows a loading device 614, with a mechanical vibration device 615 that has a tapered projection 615A that is inserted into and contacts the inner edge of the central opening 624 of the flange 616. Like the expander 515 of the previous embodiment, the purpose of the vibration device 615 is to alleviate bridging or plugging in the loading device 614 and shake the pellets 25 out of the loading device 614. The vibration device 615 includes a motor-driven eccentric weight or electromagnetic shaker or linear actuator which causes the device 615 to vibrate. When the projection 615A is inserted into and contacts the flange 616, it shakes free any bridged pellets stuck in the loading device 614. The tapered shape of the projection 615A enables it to be used in loading devices with various sized openings.

To use the vibration device 615, a worker would first remove the loading device 614 from the reactor tube 10 (after catalyst has been loaded into the tube 10). The worker would then visually inspect the loading device 614 to see if there is any bridged catalyst in it. If the loading device is empty (i.e. no bridging), then there is no need to use the vibration device. However, if there is bridging so that some pellets 25 remain in the loading device 614, the worker would position the bottom end of the loading device 614 over the reactor tube 10 (or over some type of collection bin) and insert the vibration device projection 615A into the top opening 624 of the loading device 614 or anywhere along the loading device 614. Generally, the worker would hold the loading device 614 in one hand and would hold the handle of the vibration device 615 in the other hand. The worker would then activate the vibration device 615 to cause it to vibrate. Since the vibration device 615 is in contact with the loading device 614, it also causes the loading device 614 to vibrate. The vibration of the loading device 614 shakes the pellets 25 loose so that they fall out of the loading device 614 into the reactor tube 10 or bin (not shown).

This particular loading device 614 also has outage measurement markings 617 on its outer surface. The markings 617 may be used by the worker to check the height of the outage or empty space above the pellets in the filled reactor tube 10. To use the outage markings, the worker simply inserts the loading device 614 into a reactor tube 10 that has been loaded with pellets 25 until the bottom 630 of the loading device 614 rests on the top of the pellets 25 in the reactor tube 10. The worker then looks at the markings 617 to measure the height of the outage or empty space above the pellets 25 in order to ensure that all the tubes 10 are filled to substantially the same height. Such markings 617 could be present on any of the other embodiments as well.

Figure 25:
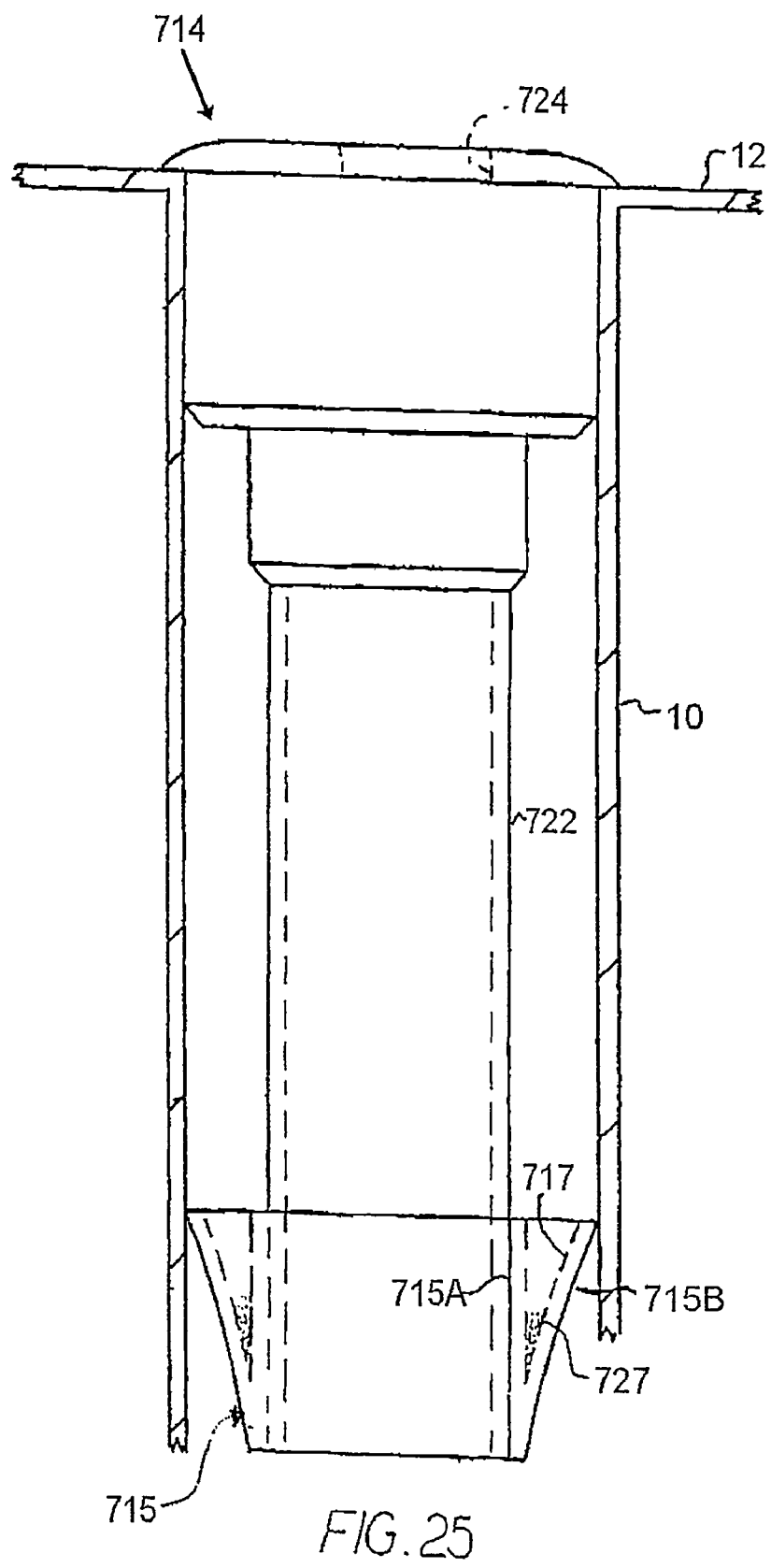
FIG. 25 is a side view of another embodiment of a loading device for loading pellets into a chemical reactor tube, including a dust catching attachment.

FIG. 25 shows a loading device 714 (inserted into a chemical reactor tube 10) with a dust catching portion 715 on the bottom of the tubular sleeve portion 722. In addition to catching dust, the dust catching portions 715 also minimize upward convection of gases in the tubes 10 while they are being loaded. The dust catching portion 715 has an inner wall 715A and an outer wall 715B. The inner wall 715A tightly surrounds and is adhered to the tubular portion 722, and the outer wall 715B tapers inwardly from top to bottom until the inner and outer walls 715A, 715B merge at the bottom of the attachment 715 to close the bottom so it will retain the dust or block upward convection of gas vapors. The widest portion of the outer wall 715B is just slightly smaller than the inside diameter of the reactor tube 10, so the dust catching portion 715 essentially fills the space between the tubular portion 722 and the reactor tube 10. This configuration creates a wide mouth at the top of the dust catching portion 715 and a void space 717 between the inner and outer walls 715A, 715B for catching and storing any dust particles 727 that may fall between the loading device 714 and the tube sheet 12 and blocking upward convection gas flow. The outer wall 715B is tapered from a smaller diameter at the bottom to a larger diameter at the top to make it easier to insert the loading device 714 into the reactor tube 10.

Figure 26:
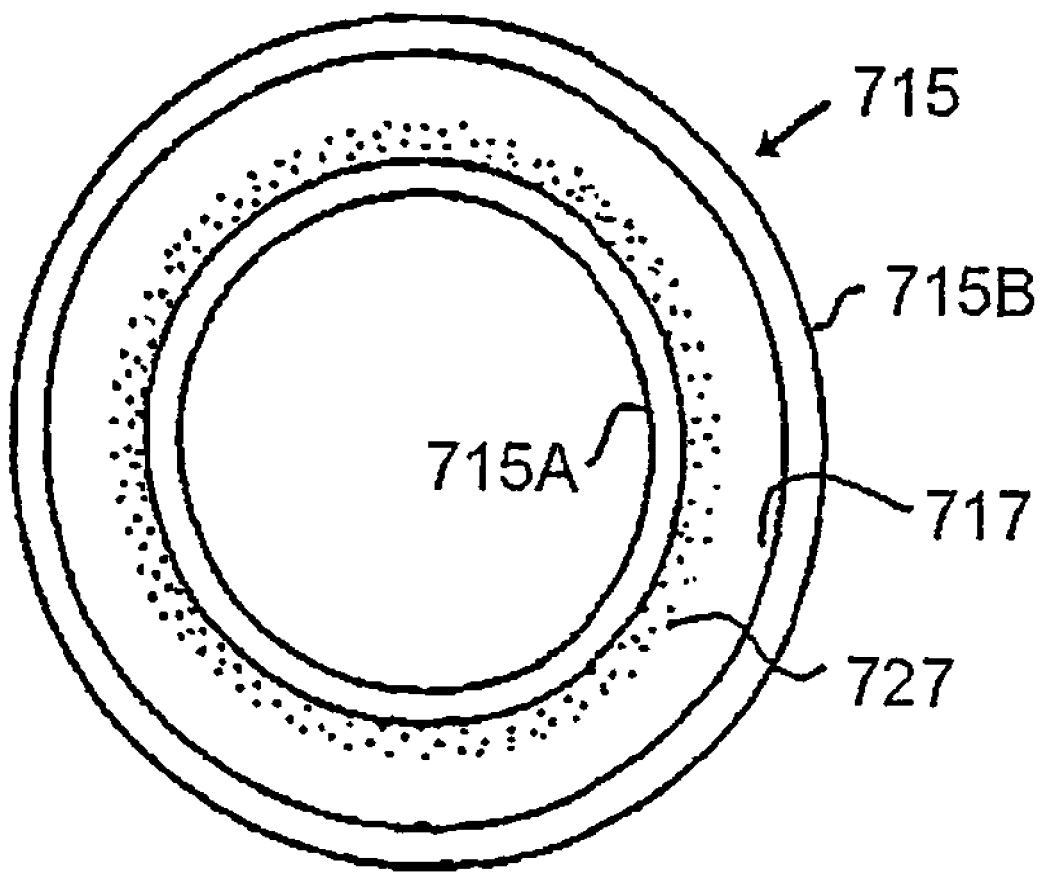
FIG. 26 is a top view of the dust catching attachment of FIG. 25.

FIG. 26 is a top view of the dust catching portion 715 with dust particles 727 in the void space 717. The dust catching portion 715 may be used to catch stray dust particles, or it may be used to catch dust particles intentionally routed towards the attachment. For instance, it could be used with the loading device 414 shown in FIGS. 15-17. That loading device has bumps 440 that space the flange 416 up from the tube sheet. The dust catching portion 715 could be used to catch any dust that is swept into the reactor tube 10 through the space between the flange 416 and the tube sheet 12.

Figure 27:
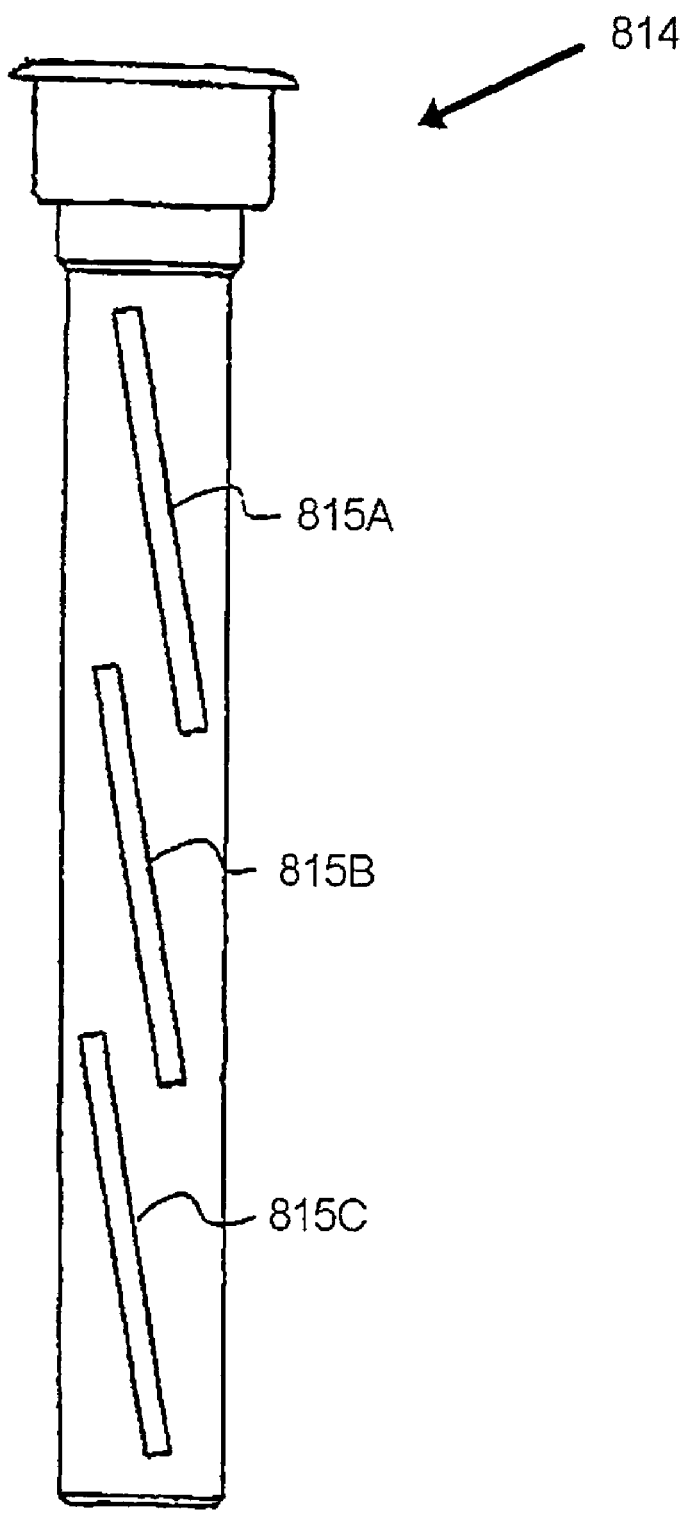
FIG. 27 is a side view of yet another embodiment of a loading device made in accordance with the present invention, including a plurality of slots.

FIG. 27 shows a loading device 814 with slotted windows 815A, 815B; 815C lying at a slight angle from the vertical, with the bottom of the upper window 815A extending to a lower elevation than the top of the next adjacent window 815B (i.e. so the windows vertically overlap each other). The windows 815A, 815B, 815C are slots that extend through the tubular insert 822 and are wide enough to allow one to easily view into the loading device 814 to see whether there are any bridged pellets 25 inside but narrow enough to prevent catalyst pellets 25 from entering or becoming stuck in the window 815. The windows 815 collectively extend along nearly the entire height of the tubular insert 822, but are spaced apart circumferentially so as not to weaken the tubular insert 822. In this case, the slots are slanted slightly, but they could alternatively be vertical or even a combination of vertical and slanted windows. If bridging is observed, a narrow utensil, such as a screwdriver, could be placed into the window 815 to pry the bridged catalyst free, or a vibration device, as described earlier, or some other mechanism could be used to dislodge the pellets from the device.

FIGS. 28-29 show another loading device 914 for loading pellets 25 into a reactor tube 10. In this embodiment, the height of the flange 916 is approximately the same as the height of the pellets 25 to be loaded. As a result, when the pellets 25 are deposited onto the tube sheet 12, falling between the flanges 916, a bottom layer of pellets 25 is formed, which, together with dust particles 27, largely fills in the spaces between the flanges 916. Additional whole pellets 25 lying on top of this bottom layer then can be swept, poured, or otherwise moved easily onto the flanges 916 and into the openings 924 to fill the reactor tubes 10, with dust particles 27 falling down into the spaces between the flanges 916. After the reactor tubes 10 are loaded, the bottom layer of pellets is vacuumed up along with any dust lying on the tube sheet 12. The whole pellets 25 then may be screened out and re-used. As shown in FIG. 29, the flange 916 in this case is essentially circular and has a single projecting tab 916A. Of course, this is just an example of one of many possible flange configurations that could be used that would have a height substantially the same as the height of the pellets 25. In these types of flanges, which are made roughly the height of the pellets 25 in order to facilitate the movement of pellets from the tube sheet 12 onto the flange, it is preferred for the height of the flange at its outer edge to be 75%-125% and most preferred to be 90%-110% of the minimum dimension of the pellets to be loaded.

Figure 30:
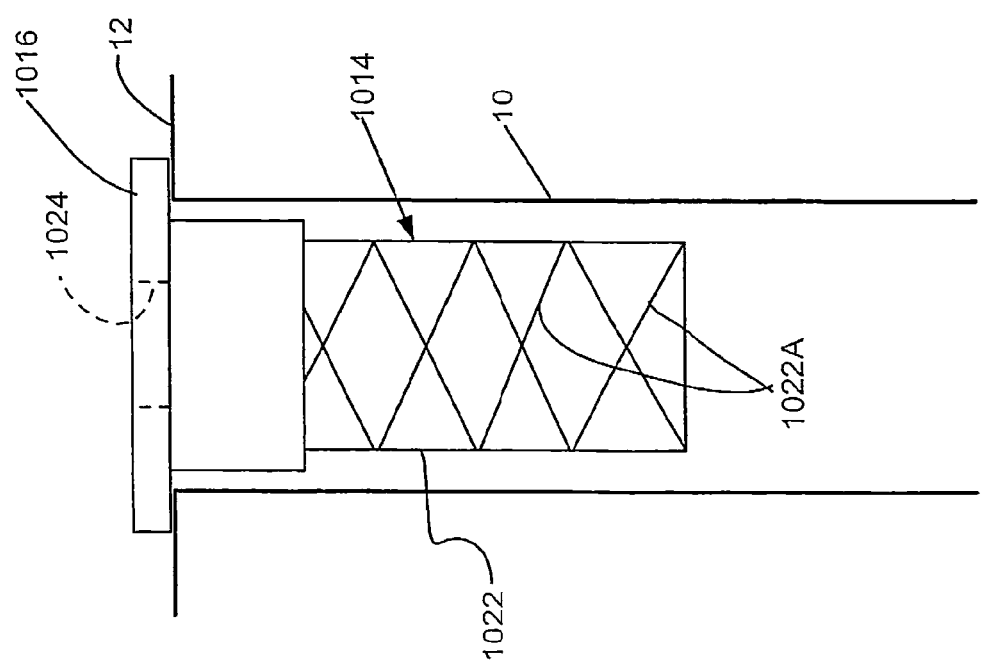
FIG. 30 is a schematic side view of still another embodiment of a loading device made in accordance with the present invention, showing the loading device mounted in the chemical reactor tube prior to catalyst being loaded.

FIGS. 30-34 show another loading device 1014 as it is used in the pellet 25 loading process. FIG. 30 shows the loading device 1014 mounted in a chemical reactor tube 10 and awaiting the loading stage (this is also schematically represented in stage 1 of FIG. 32). Like previous embodiments, the loading device 1014 includes a flange portion 1016 that rests on the reactor tube sheet 12. The flange 1016 defines a central opening 1024 through which pellets 25, such as catalyst, are loaded. However, unlike previous embodiments, this loading device 1014 has a flexible tubular extension 1022 instead of a rigid extension. More particularly, the flexible tubular extension 1022 of this embodiment is made of individual fiber elements 1022A braided together to form a net-like structure. The braided elements 1022A give the insert 1022 a tightening quality similar to a "Chinese fingertrap", a novelty toy in which a finger is inserted into each end of the braided tube, and, when the fingers are pulled in opposite directions, putting the tube in tension, the braided tube tightens around the fingers. Similarly, when the lower portion of the braided tube 1022 in this embodiment is pulled downwardly, with the upper portion fixed, putting the braided tube 1022 in tension, the inside diameter of the braided tube 1022 contracts around the pellets, and when the bottom portion is pushed upwardly, with the upper portion of the braided tube 1022 fixed, putting it in compression, the inside diameter expands and releases the pellets. This quality of the braided tube extension 1022 is explained in greater detail with reference to FIGS. 31-34. (This arrangement also is similar to a stent used in angioplasty.) The spaces between the braided fibers 1022A are smaller than the smallest dimension of the pellets 25, so the pellets 25 do not fall out between the fibers 1022A.

Figure 31:
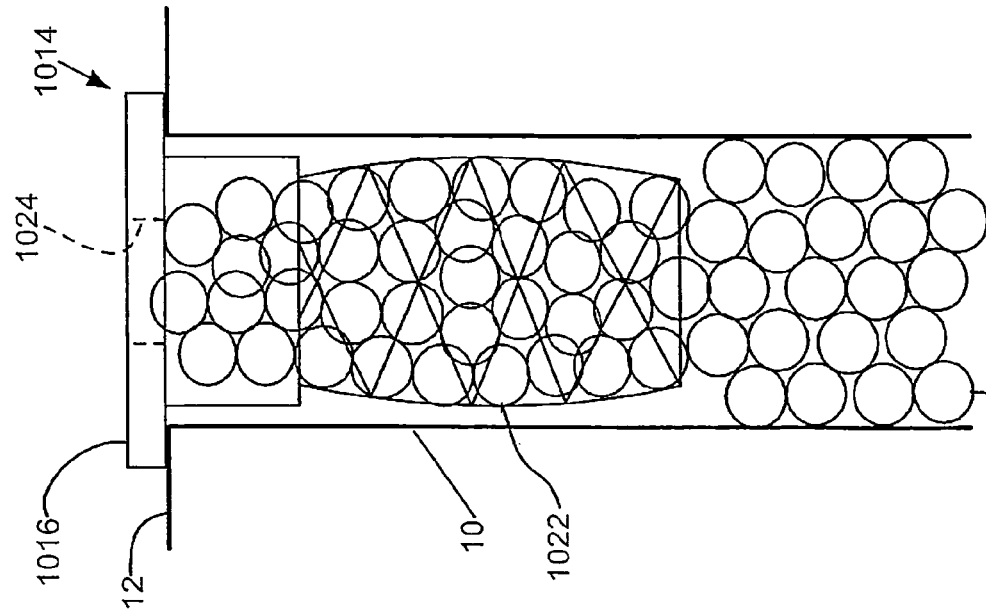
FIG. 31 is the same view as FIG. 30 but with catalyst pellets filling the reactor tube and loading device.
Figure 32:
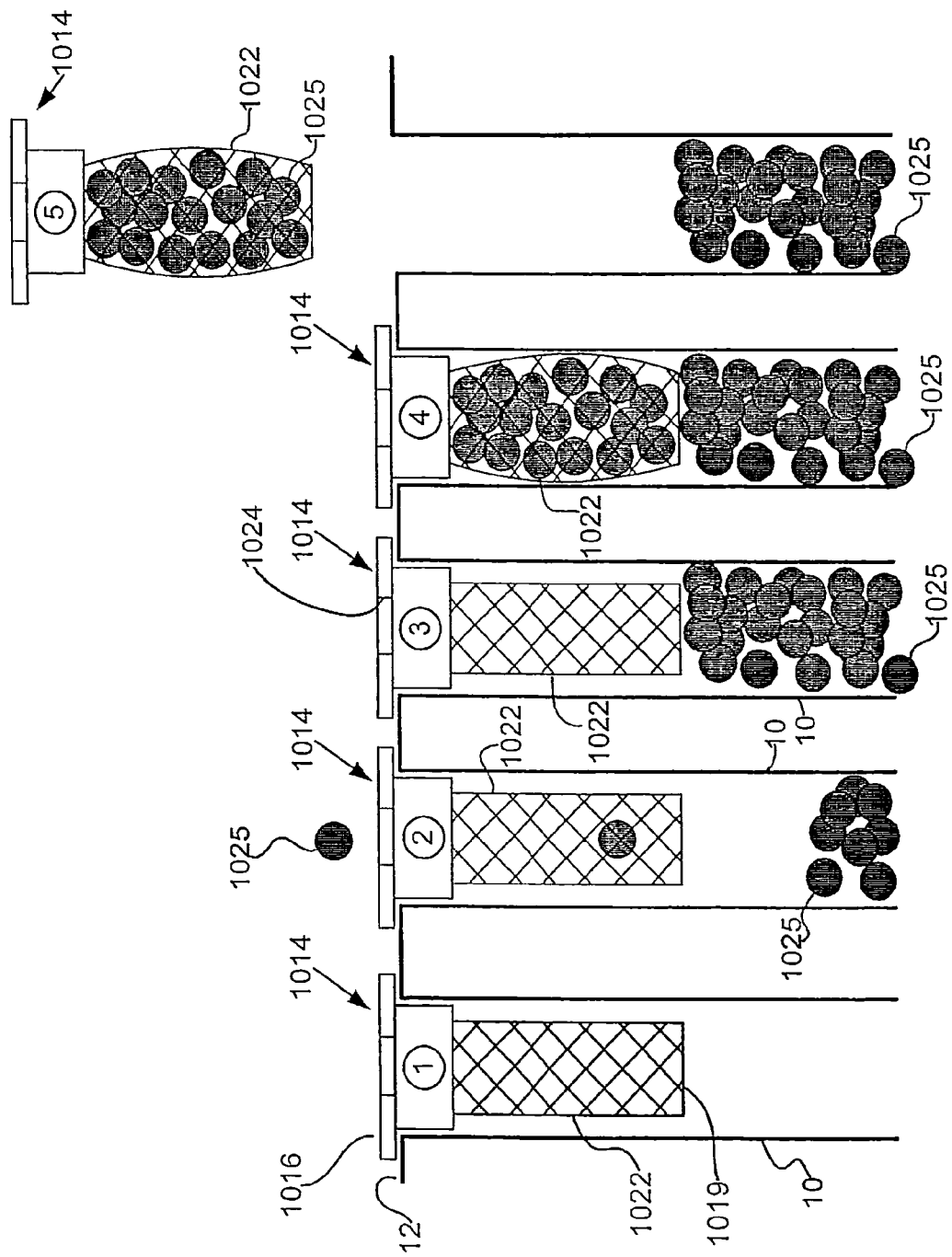
FIG. 32 is a schematic view of a sequence of five stages in the loading of catalyst in the reactor tube of FIG. 30, where stages 1 and 4 correspond to FIGS. 30 and 31 respectively.
Figure 34:
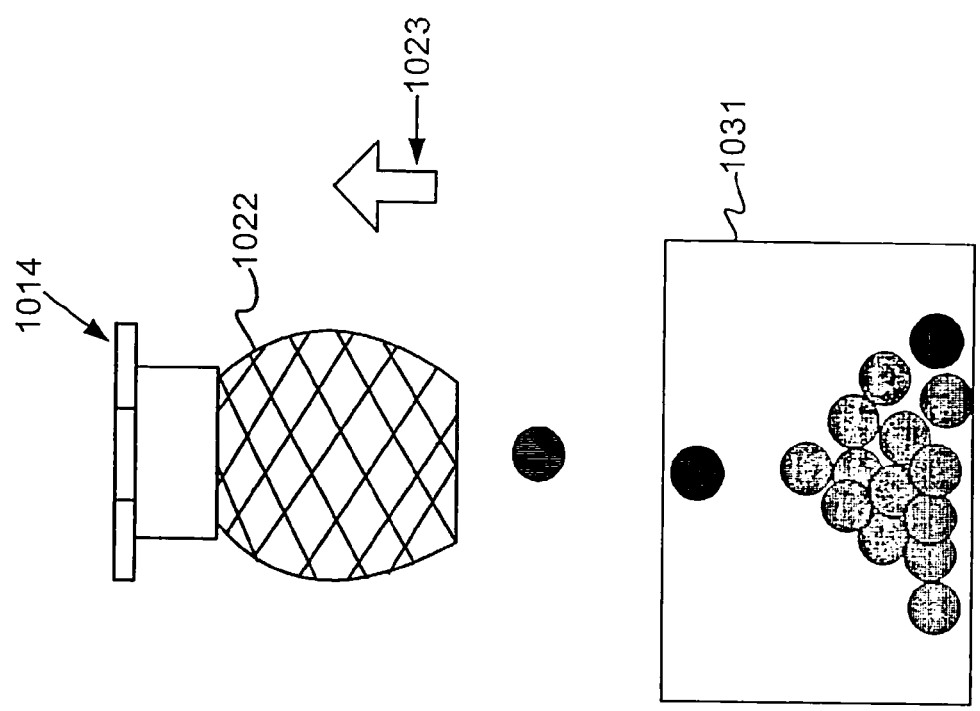
FIG. 34 is a schematic side view of the loading device of FIG. 33 once the pellets have been removed.
Figure 33:
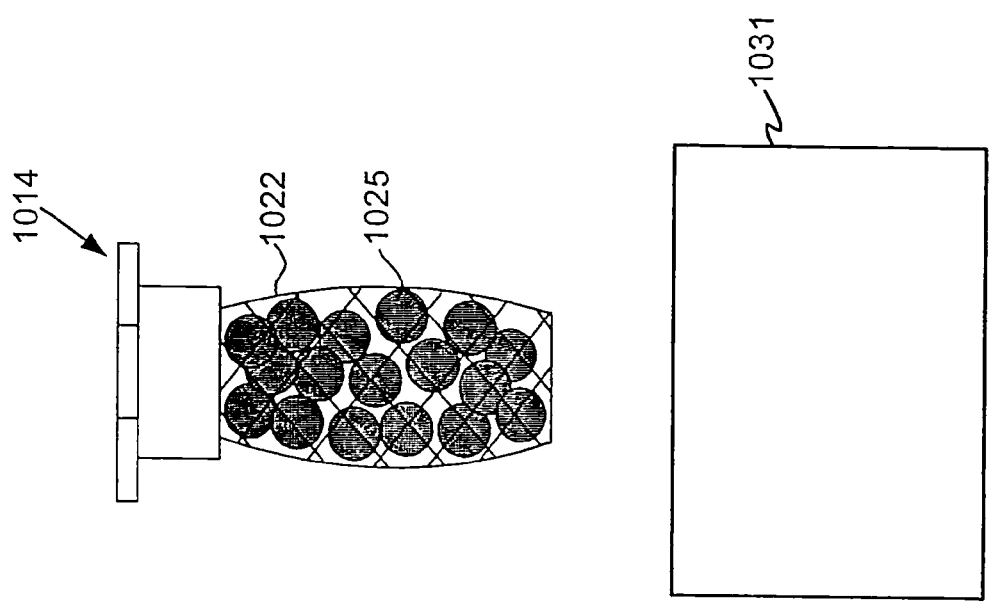
FIG. 33 is a schematic side view of the loaded loading device corresponding to stage 5 of FIG. 32 before its pellets are removed.

FIG. 31 shows the loading device 1014 after the pellets 1025 (in this case the pellets are spherical, but they could just as easily be cylindrical or have other shapes) have filled the reactor tube 10 and the loading device 1014 (this is also schematically represented in stage 4 of FIG. 32).

As the pellets 25 are being loaded, as shown in stage 2 of FIG. 32, there are no significant forces (e.g. tension or compression) on the braided sleeve extension 1022. The pellets 1025 simply enter through the opening 1024 in the flange 1016, fall through the sleeve 1022, and accumulate in the reactor tube 10. Eventually, the level of the pellets 1025 within the reactor tube 10 reaches the bottom of the loading device 1014 as shown at stage 3 in FIG. 32, and then the pellets 1025 begin to fill up into the loading device 1014 as shown at stage 4 in FIG. 32. As the pellets 1025 fill the bottom portion of the braided extension 1022 that extends beyond any rigid portion of the loading device 1014, that bottom portion of the braided extension 1022 bulges outwardly, toward the inner wall of the reactor tube 10. This is schematically represented in stage 4 of FIG. 32. Once filled, the loading device 1014 is picked up and removed from the reactor tube 10 (this is schematically represented in stage 5 of FIG. 32).

This embodiment 1014 differs from previous embodiments, in that it provides a mechanism to ensure that the pellets 1025 that are inside the loading device 1014 remain with the loading device 1014 as it is removed. As the weight of the pellets 1025 in the loading device 1014 pulls the lower portion of the tubular insert 1022 downwardly, the braided sleeve 1022 contracts around the pellets 1025, locking the pellets 1025 in the loading device 1014, so they are removed from the reactor tube 10 along with the loading device 1014. As a result, there is a gap, or outage, at the top of the reactor tube 10 equal to the distance the loading device 1014 projected into the reactor tube 10. The captured pellets 1025 can then be released from the loading device 1014 by pushing upwardly on the bottom of the braided sleeve 1022, (as shown schematically in FIGS. 33 and 34) in the direction of the arrow 1023 of FIG. 34, allowing the captured pellets 1025 to be released into a storage container 1031 for subsequent use. This is an example of a loading device in which the diameter of the loading device changes as the device is being used, with the diameter being reduced to retain the pellets and then being increased to release the pellets.

While this embodiment shows a braided fiber sleeve 1022, which may be made of any suitable material, such as metal or plastic, it is understood that the sleeve 1022 need not be braided in order to perform this desired function. For example, a spiral spring, pivoting tongs or fingers, or other similar devices could be used to allow the pellets 1025 to fall through and then grip any pellets remaining in the loading device as it is lifted out. Loading devices that permit the pellets 1025 to fall through during the loading process and then retain the pellets that are remaining in the loading device as it is being lifted out may be referred to more generally as "gripping sleeves".

The use of "gripping sleeves", such as the gripping sleeve 1014 described above and others described below, which retain the pellets inside the loading device as it is removed from the reactor tube, permits the accurate and consistent loading of tubes in a reactor vessel directly to the outage level, without the need for adding catalyst or vacuuming out surplus catalyst to reach the outage level once the loading device is removed.

Referring to FIG. 32, the gripping sleeve 1014 is installed in the tube 10 with the flange 1016 resting on the tube sheet 12 and the bottom edge 1019 of the loading device 1014 hanging down into the tube 10 at the desired outage level. The catalyst pellets 1025 are poured, brushed or otherwise added into the loading device 1014 as shown in FIG. 32, stage 2. Once the catalyst 1025 reaches the bottom edge 1019 of the loading device 1014, the catalyst 1025 fills the loading device 1014 only (not the portion of the tube 10 surrounding the loading device 1014) and the relative velocity of the catalyst pellets 1025 passing through the opening at the bottom edge 1019 of the loading device 1014 falls to zero.

With the catalyst 1025 in the loading device 1014 at a standstill, and with a number of catalyst pellets 1025 at the same elevation, the catalyst 1025 bridges in the loading device 1014 and pushes radially outwardly on the sleeve 1022. An important difference between this gripping sleeve 1014 and prior art loading devices is that it includes a mechanism that enhances the natural tendency of the catalyst 1025 to bridge within the sleeve in order to form a much more stable and reliable bridge as discussed in more detail below. As a result, the loading device 1014 can be removed from the tube 10, and with it all the catalyst pellets 1025 within the loading device 1014 with little risk that unintended jostling or handling of the loading device 1014 at an inopportune moment will result in partial or total evacuation of the pellets 1025 within the loading device 1014. Thus, as the loading device 1014 is removed, the level of catalyst pellets 1025 in the tube 10 remains at the desired outage level.

With respect to this gripping sleeve loading device 1014, the bridging mechanism is based on the "Chinese finger trap" principle described earlier. As the catalyst 1025 fills the loading device 1014, the braided fiber sleeve 1022 expands radially as shown in FIG. 32, stage 4. As soon as the loading device 1014 is lifted (as shown in FIG. 32, stage 5) there is sufficient friction between the pellets 1025 and the sleeve 1022 that the weight of the catalyst 1025 pulls downwardly on the braided fiber sleeve 1022, putting it in tension. This causes the diameter of the sleeve 1022 to reduce, contracting around the pellets 1025 and locking the pellets 1025 in the loading device 1014, so they may be removed from the reactor tube 10 along with the loading device 1014. This reduction in diameter is a kind of obstruction which helps retain the pellets in the loading device 1014.

There are other pellet-retaining mechanisms which can be used instead of (or in addition to) the "Chinese finger trap" principle of this loading device 1014. FIGS. 35-52 depict several of these mechanisms, as discussed below.

FIG. 35 depicts another embodiment of a loading device 1114 made in accordance with the present invention. This loading device 1114 is similar to the loading device 14A of FIG. 4, except its pellet-retaining mechanism includes an obstruction 1130 adjacent the bottom edge 1119 of the sleeve 1122 which effectively reduces the internal cross-sectional area of the sleeve 1122 adjacent its outlet opening. In this case, the obstruction 1130 is fixed, so its dimensions do not change while the loading device is being used.

FIG. 36 depicts in greater detail the clip obstruction 1130 of FIG. 35. This is a "C" clip 1132 which snaps around the tubular sleeve 1122 of the loading device 1114. The clip 1130 includes a pin 1134 which, as shown in FIG. 37, bisects and extends through the walls of the sleeve 1122. Of course, the pin 1134 need not bisect the tubular sleeve 1122; it could be offset to one side if desired (not shown), and there could be one or more pins projecting into the open space inside the tubular sleeve 1122. Also, the pin 1134 need not extend fully across the tubular sleeve 1122; it could instead extend only partially across and terminate short of the opposite wall of the tubular sleeve 1122 (not shown).

The clip obstruction 1130 acts so as to enhance the bridging tendency of the catalyst pellets. As long as the pellets are moving past the pin 1134 of the clip obstruction 1130, the pellets are substantially unhindered by the clip obstruction 1130. However, once the velocity of the pellets moving past the pin 1134 is close to zero (such as when the reactor tube 10 fills to the level of the pin and the pellets begin to accumulate in the loading device 1114, similar to stage 4 in FIG. 32), the clip obstruction 1130 comes into play, not only enhancing the bridging tendency of the pellets at the pin 1134, but also making the resulting bridge a more stable bridge which is more difficult to dislodge and less likely to break down even in the event of an accidental jostling when handling the loading device 1114.

FIG. 38 depicts another embodiment of a loading device 1214 made in accordance with the present invention. This loading device 1214 is similar to the loading device 1114 of FIG. 37, except that the obstruction 1230 adjacent the bottom edge of this loading device 1214 is a plastic tie wrap 1230 instead of the "C" clip 1130 of the previous embodiment 1114. As shown in FIG. 38A, these plastic tie wraps 1230 have a slot at one end and wedge-shaped teeth at the other. The toothed end slides through the slot at the other end and functions as a ratchet mechanism, being easily tightened and then locking so it cannot loosen. This type of tie wrap is well-known and is often used for holding wires together and for other similar uses. This embodiment 1214 is less expensive to manufacture than the previous embodiment 1114 but works in the same manner and is just as effective in enhancing the bridging tendencies of the catalyst pellets within the loading device 1214 to cause the pellets to be reliably retained within the loading device so they can be lifted out of the reactor tube with the loading device.

Figure 39:
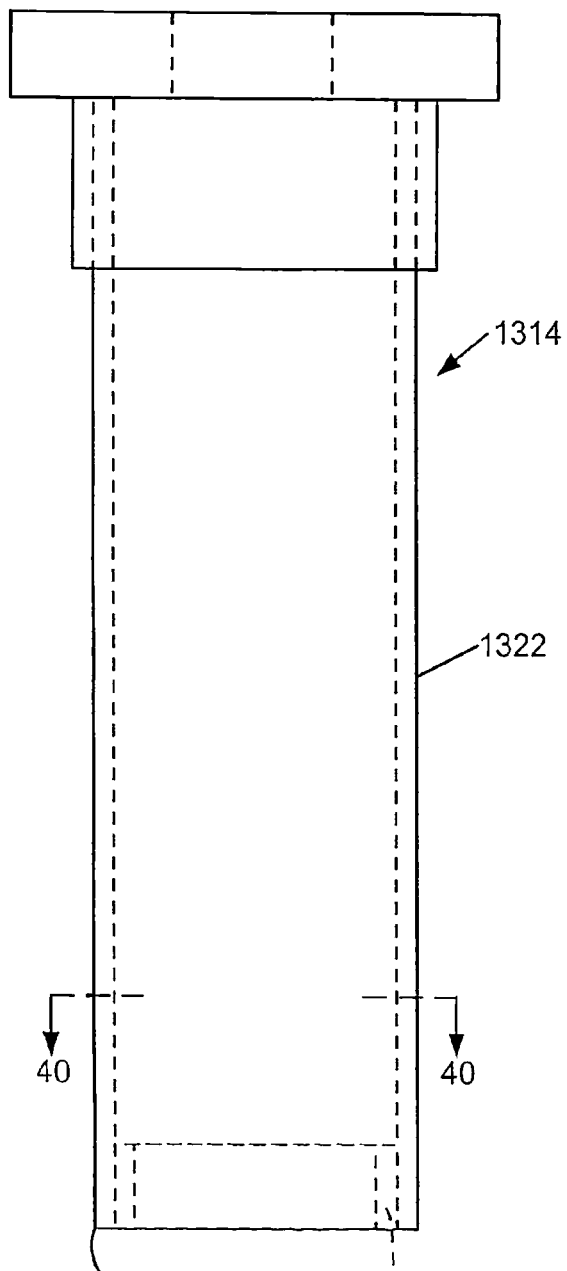
FIG. 39 is a side view of another embodiment of a loading device made in accordance with the present invention, showing a different type of obstruction at the bottom of the loading device.
Figure 40:
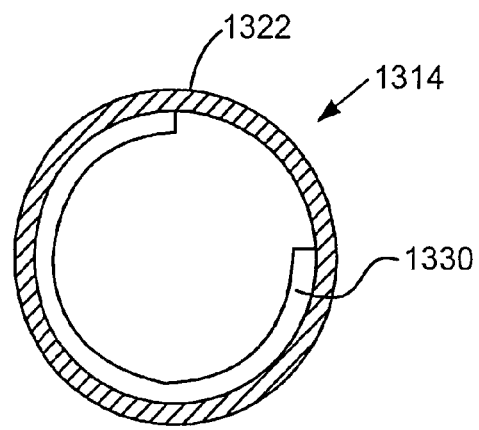
FIG. 40 is a view along line 40-40 of FIG. 39.

FIGS. 39 and 40 depict another embodiment of a loading device 1314 made in accordance with the present invention. This loading device 1314 is similar to the loading device 1114 of FIG. 37, except that the obstruction 1330 adjacent the bottom edge 1319 of the loading device 1314 is a partial-circular shoulder obstruction 1330 instead of the "C" clip 1130 of the earlier embodiment 1114. As was the case for the loading device 1114, the partial-circular shoulder obstruction 1330 is effective in enhancing the bridging tendencies of the catalyst pellets within the loading device 1314, once the relative velocity of the pellets across the obstruction 1330 approaches zero, so the pellets are reliably retained in the loading device and can be lifted out with it. In this case, the shoulder obstruction 1330 is just a short piece of pipe that has been cut to a C-shape and glued into the inside surface of the sleeve 1322.

Figure 41:
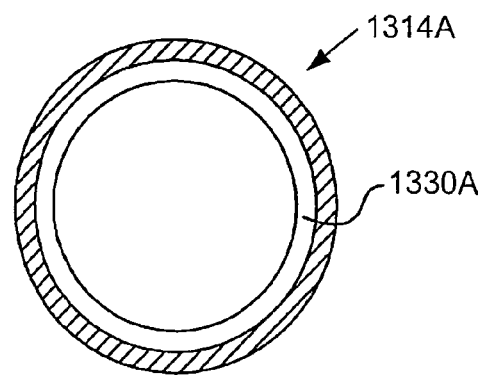
FIG. 41 is a view of another embodiment of a loading device, similar to that of FIG. 40, but with the partial ring obstruction having been replaced with a full ring obstruction.

FIG. 41 depicts another embodiment of a loading device 1314A similar to the loading device 1314 of FIGS. 39 and 40, except that the obstruction 1330A adjacent the bottom edge of the loading device 1414 is a complete circular shoulder obstruction 1330A instead of the partial-circular shoulder obstruction 1330 of the previous embodiment 1314. Again, this circular shoulder obstruction 1330A is effective in enhancing the bridging tendencies of the catalyst pellets within the loading device 1314A to help ensure that the pellets are retained in the loading device and can be lifted out with the loading device.

It should be noted that, even with the shoulder obstruction 1330A, the area of the bottom opening still is larger than the size of the inlet, so pellets can flow freely through the loading device until their level within the reactor tube 10 reaches the level of the bottom opening of the sleeve.

Figure 41A:
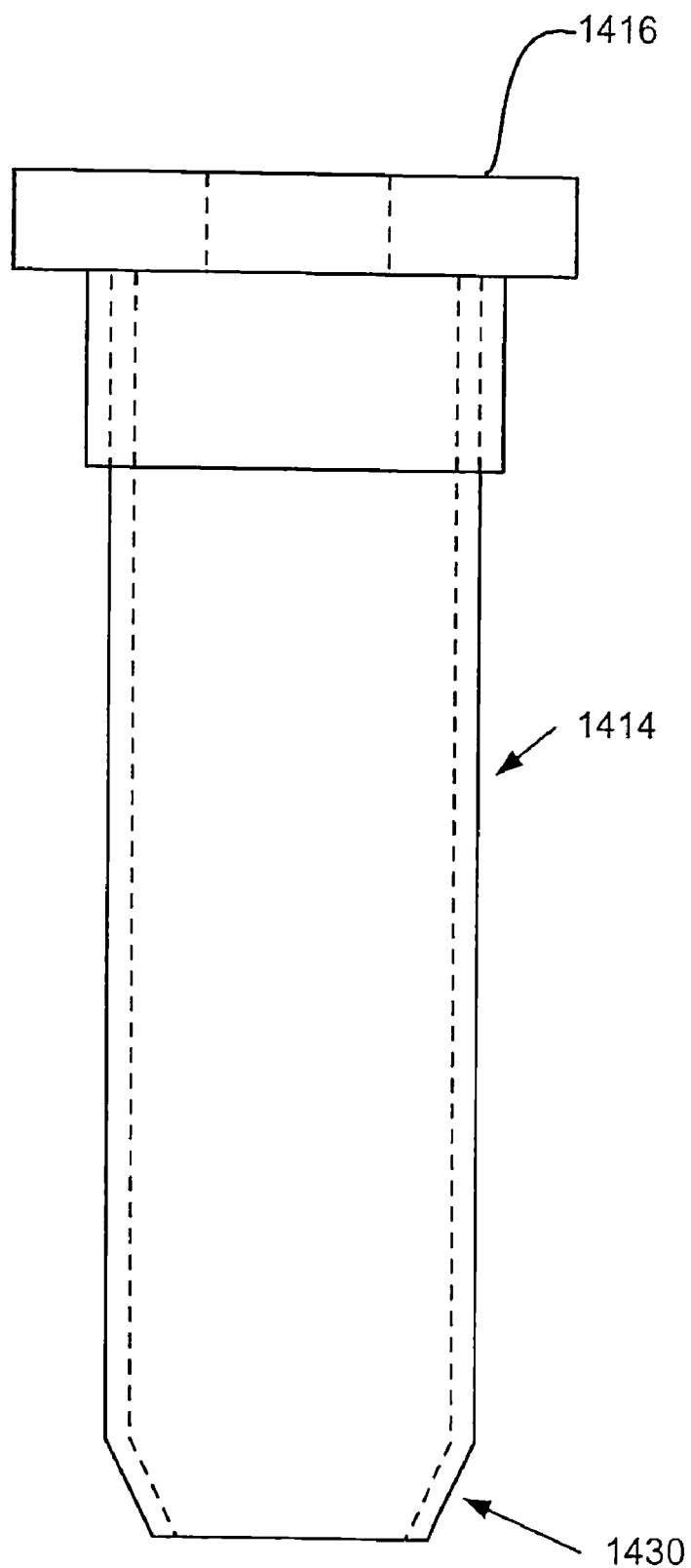
FIG. 41A is a view of another embodiment of a loading device made in accordance with the present invention.

In another embodiment, as shown in FIG. 41A, the obstruction 1430 which is formed at the lower end of the loading device 1414 is a reduced area made by tapering the lower end of the side wall to have a frustro-conical shape, with a smaller diameter at the bottom. This functions in the same manner as the previous embodiment, serving as a mechanism that helps retain the pellets in the loading device. It should be noted that, in cases where the pellets are going to be lifted out with the loading device, it generally is not necessary to fill the loading device all the way to the top with pellets and may be desirable to stop putting pellets into the loading device once the pellets have begun filling the sleeve.

Figures 42, 42A:
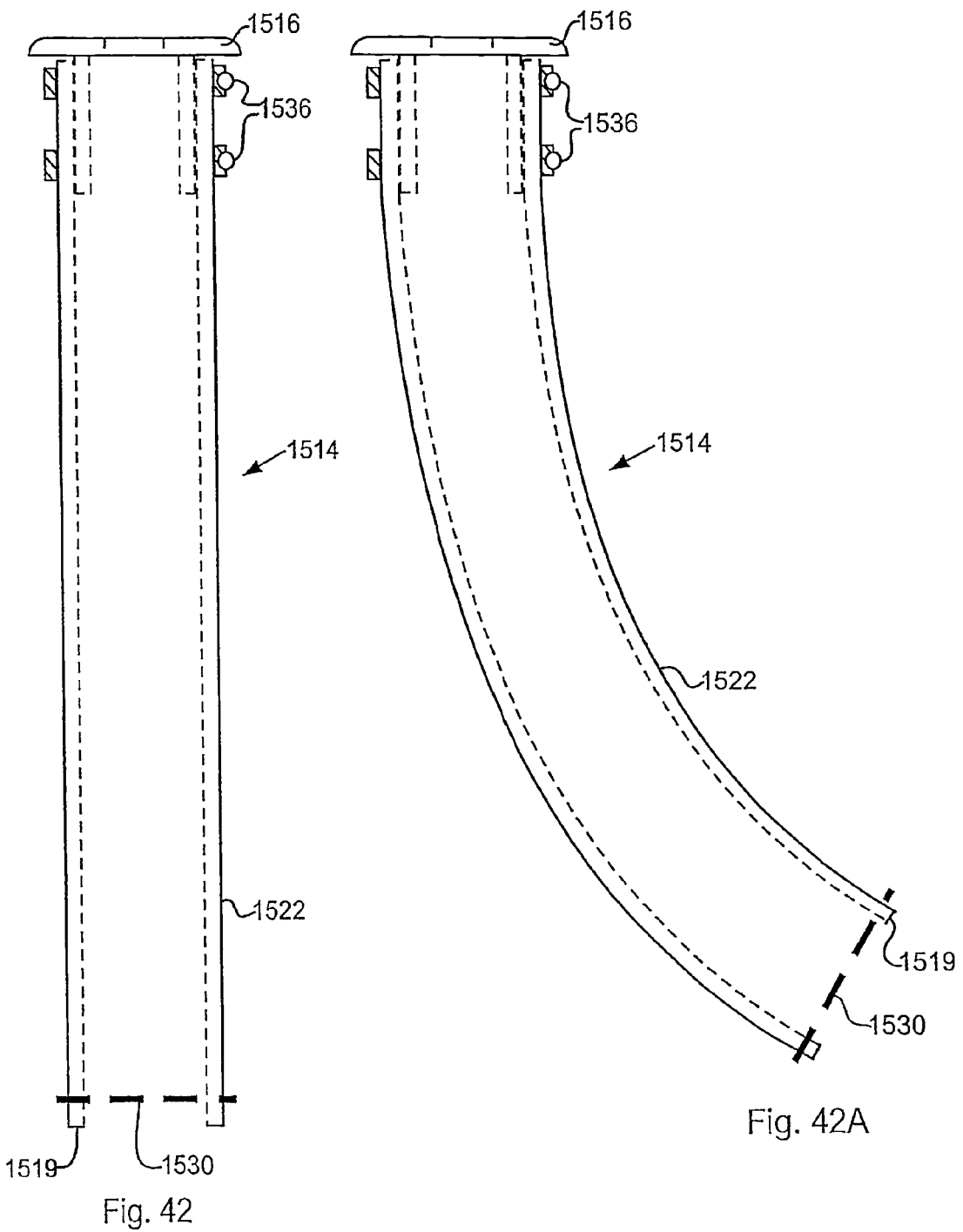
FIG. 42 is a schematic side view of another embodiment of a loading device showing a clear flexible hose extension and an obstruction at the bottom of the extension.
FIG. 42A is the same view as that of FIG. 42, but with the flexible hose shown in a flexed position.

FIGS. 42 and 42A depict another embodiment of a loading device 1514 made in accordance with the present invention. This loading device 1514 is similar to the loading device 1114 of FIG. 35, including an obstruction 1530 adjacent the bottom edge 1519 of the loading device 1514, which may be a C-clip, tie, shoulder obstruction, reduced inside diameter, or the like. However, in this embodiment 1514, the tubular sleeve 1522 is a flexible tube which, in this instance, is attached to the flange portion 1516 of the loading device 1514 via screw clamps 1536. Of course, other means of securing the flexible sleeve 1522 to the flange portion 1516 may be used, including gluing, riveting, screwing together, press fit, or even a single piece construction of the entire loading device 1514.

The flexible tubular sleeve 1522 can be bent to be installed into tubes with large outages, even in areas with limited vertical clearance. Once the loading device 1514 is installed in the tube 10, it hangs vertically as any conventional loading device as shown in FIG. 42. Once the tube 10 is loaded with catalyst and the pellets have (at least partially) filled the loading device 1514, it may be pulled out as the bridge enhancing obstruction 1530 helps retain the pellets inside the sleeve 1522 and prevents the accidental evacuation of the pellets from the loading device 1514. The flexible tubular sleeve 1522 may once again be bent to remove the loading device 1514 from the tube 10 while the pellets remain within the loading device 1514. The bridge enhancing obstruction 1530 may be any of the mechanisms disclosed in this specification, including the "Chinese fingertrap" embodiment 1014 of FIG. 30, or the like.

Figure 43:
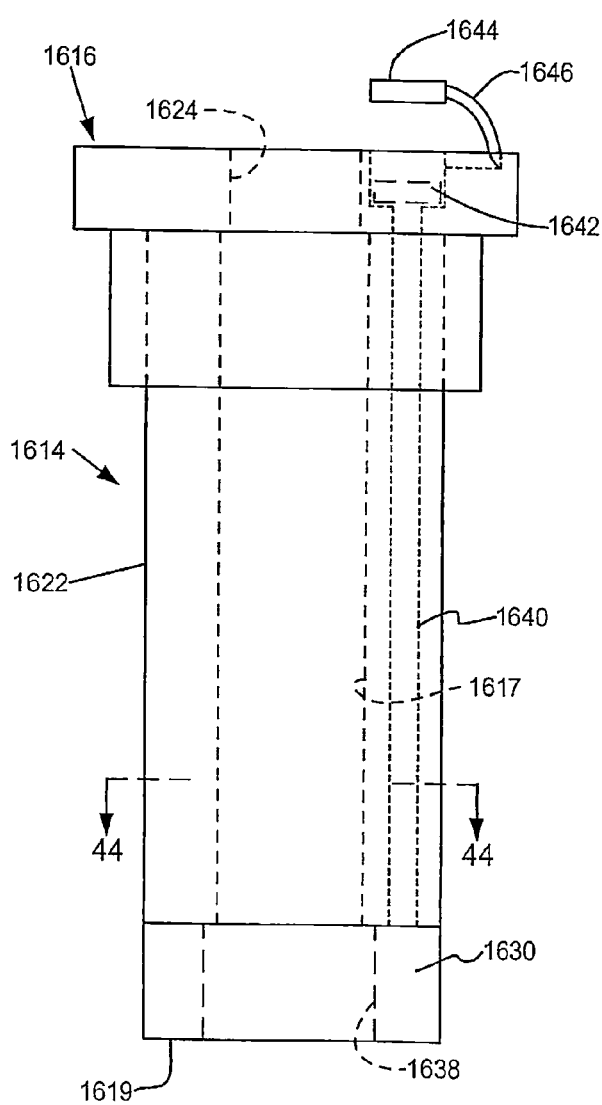
FIG. 43 is a side view of another embodiment of a loading device showing an inflatable bladder obstruction at the bottom of the loading device.
Figure 44:
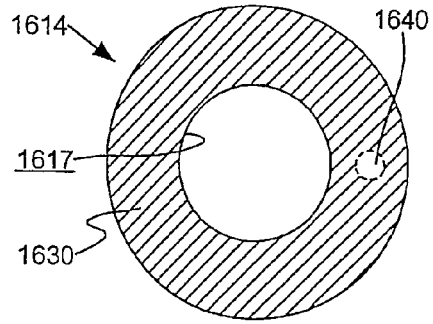
FIG. 44 is a view along line 44-44 of FIG. 43, when the bladder obstruction is deflated.
Figure 45:
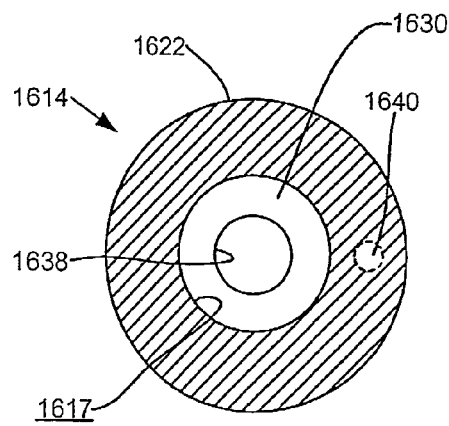
FIG. 45 is the same view as FIG. 44, but with the bladder obstruction inflated.

FIGS. 43-45 depict another embodiment of a loading device 1614. This loading device 1614 is similar to the loading device 1114 of FIG. 35, including an obstruction 1630 adjacent the bottom edge 1619 of the loading device 1614. However, in this embodiment 1614 the obstruction is a bladder 1630, which may be inflated (typically with pressurized air) such that the bottom opening 1638 goes from a first, unobstructed condition in which the bladder does not extend inwardly beyond the inner wall 1617 of the sleeve 1622 (as shown in FIG. 44) to a second, constricted condition (as shown in FIG. 45) as the bladder 1630 is inflated.

The bladder 1630 is in fluid communication with the flange portion 1616 of the loading device 1614 via a gas conduit 1640. This gas conduit 1640 terminates at the bladder 1630 at one end, and at a recess 1642 at the flange portion end of the loading device 1614. The recess 1642 is capped with a cover 1644 to keep catalyst pellets out of the gas conduit 1640 during the loading process. The cover 1644 is secured to the loading device 1614 via a strap 1646 to prevent the accidental misplacement of the cover 1644.

When the bladder 1630 is deflated, as in FIGS. 43 and 44, the inside diameter of the lower opening 1638 exceeds the diameter of the inlet opening 1624 in the flange portion 1616 of the loading device 1614 and the catalyst pellets flow relatively unimpeded. When the bladder 1630 is inflated, as in FIG. 45, the inside diameter of the lower opening 1638 is substantially reduced, preventing the catalyst pellets from falling through. As long as the bladder 1630 remains inflated, the pellets will remain captive in the loading device 1614. Once the loading device 1614 is removed from the tube 10, the bladder 1630 may be deflated to release the pellets inside the loading device 1614.

During the catalyst loading process, the loading device 1614 is installed into the reactor tube 10 in very much the same manner as shown in stage 1 of FIG. 32. The catalyst is added until the desired outage level is reached. Further loading of the pellets begins filling the tubular sleeve 1622 of the loading device 1614. Once the pellets reach a level above the bladder 1630, the bladder 1630 may be inflated by injecting air or other fluid through the conduit 1640 to capture the pellets inside the loading device 1614. A check valve (not shown) is installed at the top of the gas conduit 1640 to provide a fluid inlet for injecting the fluid and to prevent the deflation of the bladder 1630 while the loading device 1614 is being removed from the reactor tube 10. Once the loading device 1614 has been removed, the check valve is opened and the bladder 1630 is deflated to remove the pellets from the loading device 1614.

Figure 46:
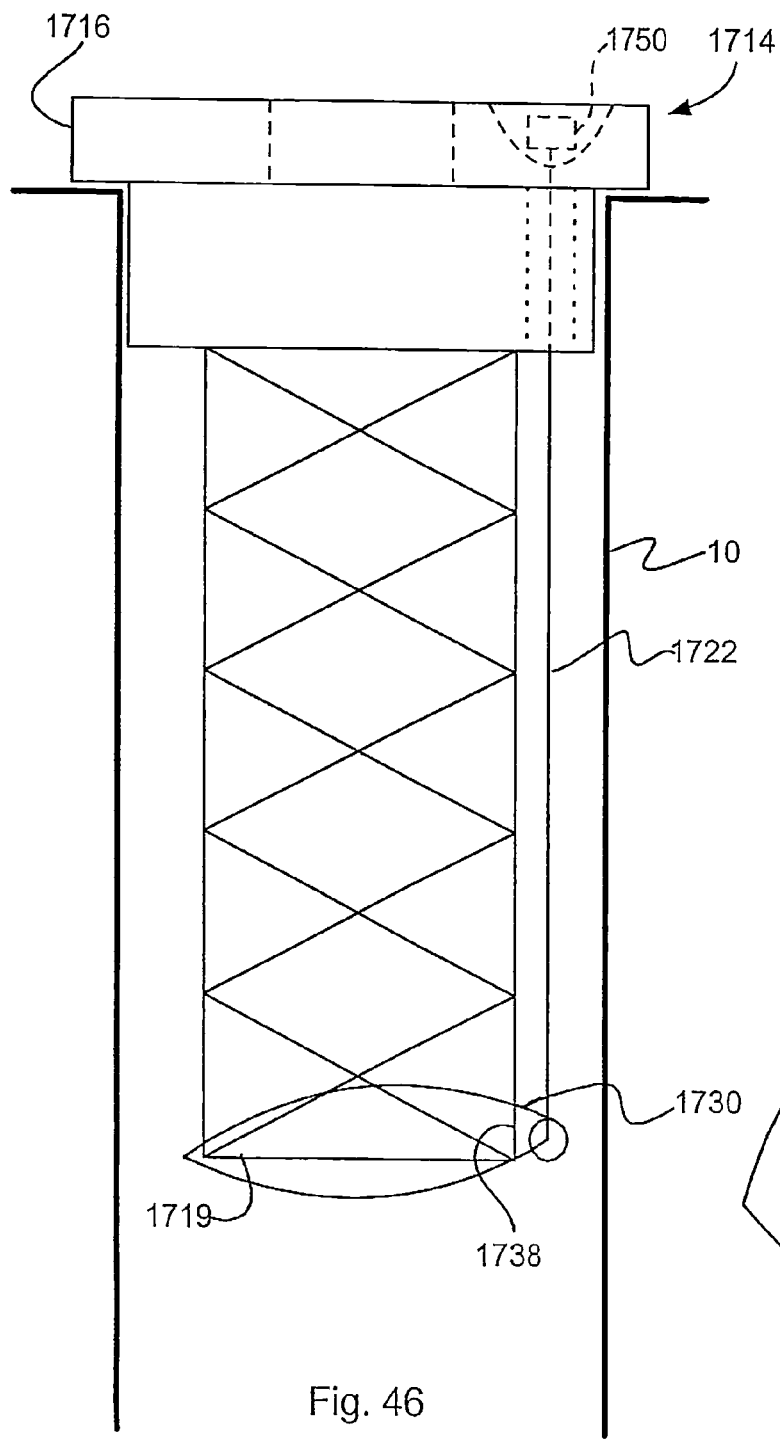
FIG. 46 is a schematic side view of another embodiment of a loading device which has a flexible extension and a noose obstruction at the bottom of the extension.
Figure 47:
FIG. 47 is a schematic view of the noose mechanism of FIG. 46.
Figure 48:
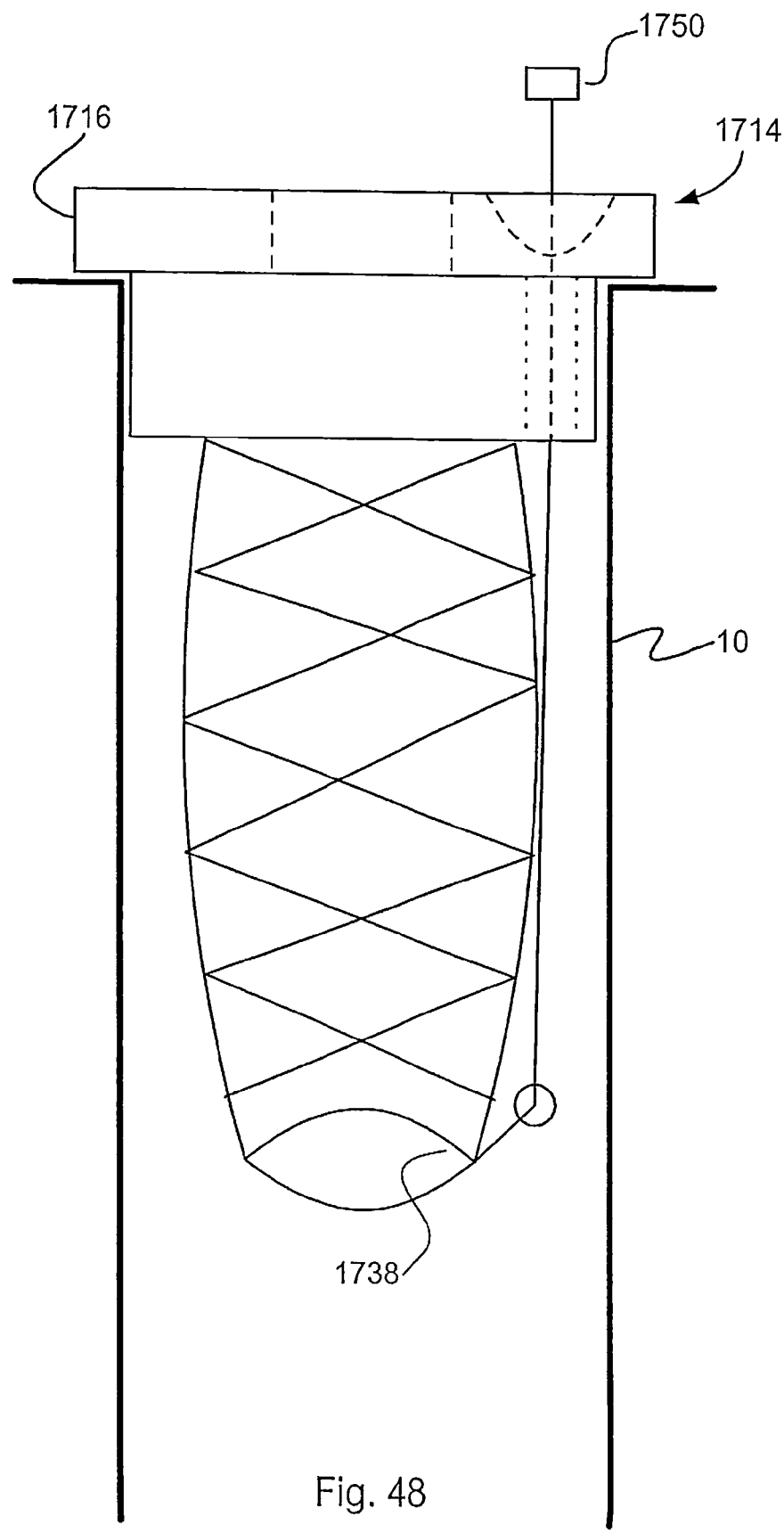
FIG. 48 is a view similar to that of FIG. 46, but when the noose has been tightened to restrict the opening at the bottom of the loading device.

FIGS. 46-51 depict another embodiment of a loading device 1714 made in accordance with the present invention. This loading device 1714 is similar to the loading device 1114 of FIG. 35, including an obstruction 1730 adjacent the bottom edge 1719 of the loading device 1714. In this embodiment 1714 the obstruction is a lasso 1730 with a slip knot (See also FIG. 47) which may be tightened (typically by pulling on the nub 1750 recessed within the flange portion 1716 of the loading device 1714) such that the bottom opening 1738 goes from a first, unobstructed condition (as shown in FIG. 46) to a second, constricted condition (as shown in FIG. 48) when the lasso 1730 is tightened.

The tubular sleeve portion 1722 of the loading device 1714 is preferably made from a flexible stent or sock material which will close down or constrict once the lasso 1730 is pulled. The lasso 1730 itself preferably is made from a material such as wire, and preferably a wire with a memory such that noose reverts to the first, unobstructed condition when the nub 1750 is released and only closes down to the second, constricted condition when the nub 1750 is pulled.

FIG. 49 is a plan view of the loading device 1714 showing the nub 1750 recessed in a cavity 1752 of the flange portion 1716 of the loading device 1714 when the nub 1750 is not being pulled and the lasso with a slip knot 1730 is in its first, unobstructed condition (See also FIG. 46). In this position, the nub 1750 is tucked away so that it does not interfere with the brushing of the catalyst pellets across the flange portion 1716 of the loading device 1714 during the catalyst loading process. FIGS. 50 and 51 depict a fork tool 1754 which may be used to retrieve the nub 1750 from its cavity 1752 so as to make the nub 1750 accessible in order to pull the noose 1730 to the second, constricted position. The flange portion 1716 of the loading device 1714 may include a small hook projection (not shown) onto which the nub 1750 can be latched to keep the noose 1730 in the second, constricted condition while the loading device 1714 is removed from the tube 10, so as to prevent the accidental release of the pellets as the loading device 1714 is being handled.

Figure 52:
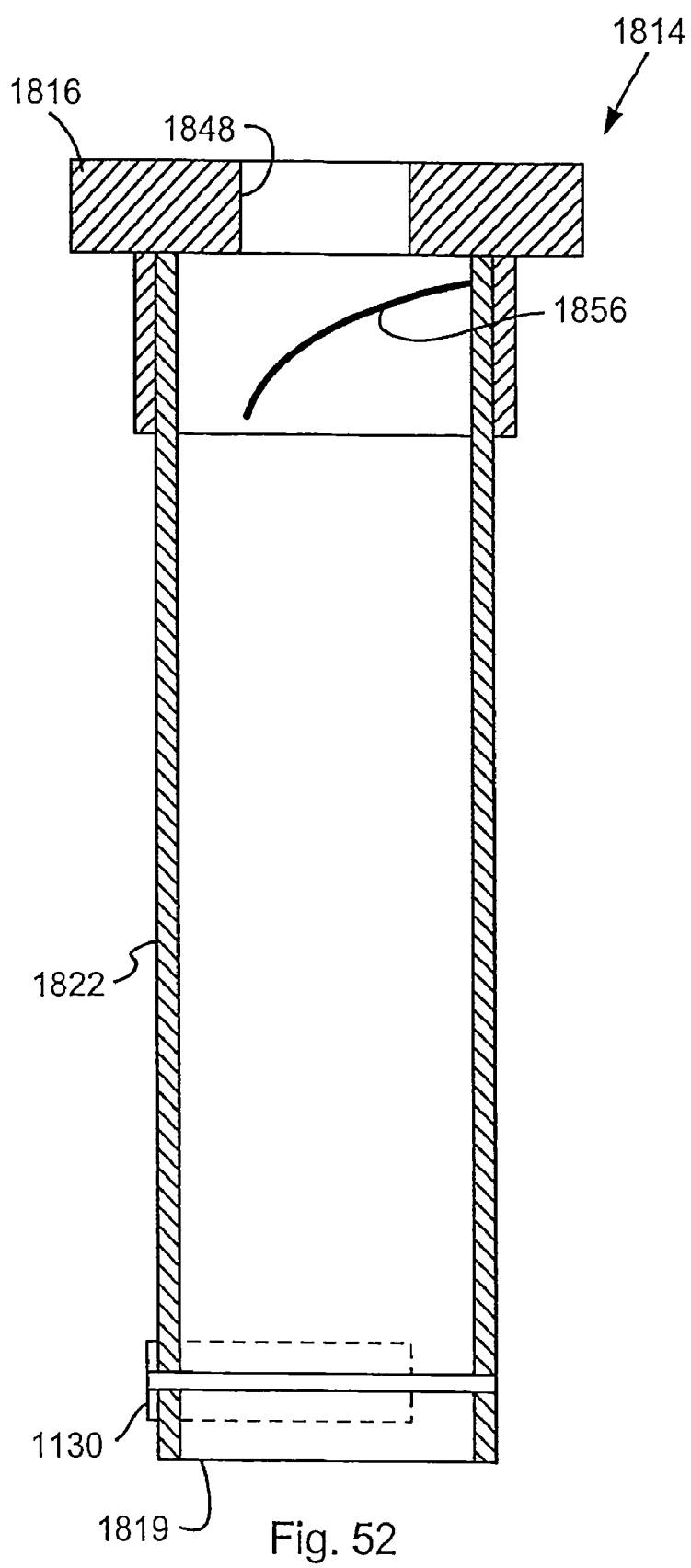
FIG. 52 is a schematic side sectional view of another embodiment of a loading device similar to that of FIG. 35, but with a flexible arm adjacent the top of the loading device.

FIG. 52 depicts another embodiment of a loading device 1814 made in accordance with the present invention. This loading device 1814 is similar to the loading device 1114 of FIG. 35, including an obstruction 1130 adjacent the bottom edge 1819 of the loading device 1814. However, this embodiment 1814 also includes a flexible arm or whisker 1856 slightly below the upper opening 1848 of the loading device 1814.

In a preferred embodiment, the whisker 1856 is a flexible wire, such as a stainless steel piano wire. As catalyst pellets enter the loading device 1814 through the upper opening 1848, they may have practically no initial vertical component of velocity (as would be the case for those catalyst pellets which are brushed across the tube sheet, onto the flange portion 1816 and into the opening 1848), or they may have a substantial initial vertical component of velocity (as would be the case for those catalyst pellets pouring from a hose or a container straight into the opening 1848). If the whisker 1856 were not present, then those pellets with a substantial vertical component of velocity might catch up, within the loading device 1822, with those pellets with practically no initial vertical component of velocity, and this might result in undesirable bridging in the loading device before the reactor tube 10 is filled to the desired outage level. Furthermore, since it is desirable to have all pellets load in the same manner in all the reactor tubes and along the entire length of the reactor tubes, then it is not desirable to have pellets begin their fall down the tube at different velocities. Preferably, the initial vertical component of velocity is nearly identical for all pellets at the same point within the tubular sleeve 1822.

The flexible arm or whisker 1856 accomplishes this condition by ensuring that the pellets are slowed down as they enter the loading device 1814. Those pellets that have practically no initial vertical component of velocity fall on the flexible arm or whisker 1856, which flexes away due to the weight of the pellet to allow the pellet to continue its fall down the loading device 1814 and into the reactor tube 10. Those pellets that have a substantial initial vertical component of velocity also fall on the flexible arm or whisker 1856, which substantially absorbs the kinetic energy of the pellet as it flexes away to allow the pellet to continue its fall down the loading device 1814 and into the reactor tube 10. In both instances, the flexible arm or whisker 1856 flexes away to allow the pellet to pass, but in the second instance the flexing is more pronounced in order to substantially absorb the kinetic energy of the pellet due to its initial vertical component of velocity.

Other mechanisms may be used to check the speed of the pellets so as to impart a near zero-vertical-velocity condition to the pellets. For instance, more than one flexible arm or whisker may be used, or a horizontal air curtain (not shown) may be used to remove or substantially reduce the initial vertical velocity of the pellets.

Many of the gripping sleeves described above may have a substantial weight as they are removed from the tube, since they are partially or fully loaded with catalyst. Thus, it may be advantageous to use a removal device to aid in the extraction of the loading device. FIGS. 53-55 illustrate one such removal device 1950. This device is a collet, with a continuous upper portion 1952 and a lower portion that includes a plurality of fingers 1954, forming a housing. At the lower end, the fingers 1954 define an upper shoulder 1956, a lower shoulder 1958, and a recess 1960 between the upper and lower shoulders. The inside surface of the fingers 1954 is tapered from a smaller diameter at the top to a larger diameter at the bottom. There is an insert 1962 inside the fingers 1954 which has a similarly tapered outer surface. An actuator 1964 is secured to the insert 1962, and a vibrator 1966 is secured on top of the collet, as shown in FIG. 55.

The actuator 1964 may be manually operated, such as a hand-operated lever, or it may be automatically operated, such as a pneumatically-operated linear actuator. Many other known actuator devices could be used as well. When the actuator 1964 is actuated, it pulls the insert 1962 upwardly.

Looking at FIG. 55, the bottom of the collet is inserted into the opening in the flange 16 of the loading device until the lower shoulder 1958 is below the flange 16, the upper shoulder 1956 is above the flange 16, and the flange 16 is aligned with the recess 1960 of the collet. Then, the actuator 1964 is actuated, causing the insert 1962 to move upwardly relative to the fingers 1954. The insert 1962 pushes outwardly on the fingers 1954, causing them to move apart to the position shown in FIGS. 54-55, thus causing the removal device 1950 to grip the loading device at the top opening.

The operator then lifts up on the removal device 1950 to lift the loading device out of the reactor tube. In one embodiment, there may be a separate handle on the removal device 1950. In another embodiment, the housing of the vibrator 1966 and actuator 1964 is shaped to serve as a handle. The vibration device 1966 may be an eccentric weight, linear pneumatic device, linear motor, or other device that imparts vibration primarily in the vertical direction to facilitate the evacuation of the loading device either as it is being removed from the reactor tube 10 or after it has been removed from the reactor tube 10, depending upon whether the operator wants to deposit the pellets that are in the device into the reactor tube 10 or elsewhere, such as into a bin.

Figure 58:
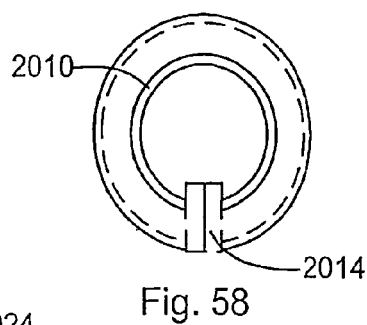
FIG. 58 is a top view of the unloading device of FIG. 57.
Figure 56:
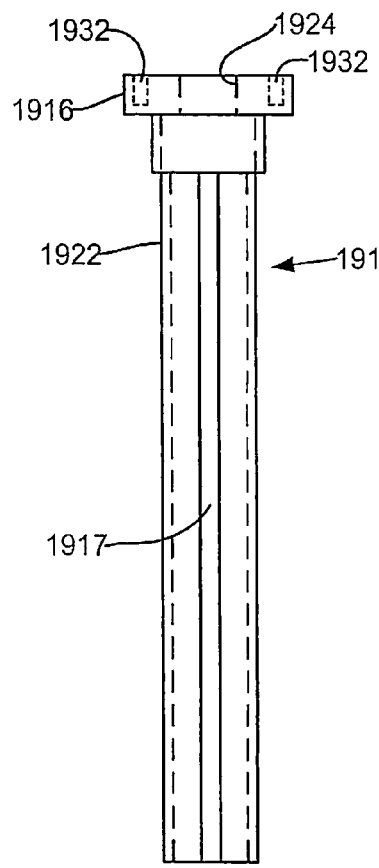
FIG. 56 is a schematic side view of another loading device made in accordance with the present invention.
Figure 57:
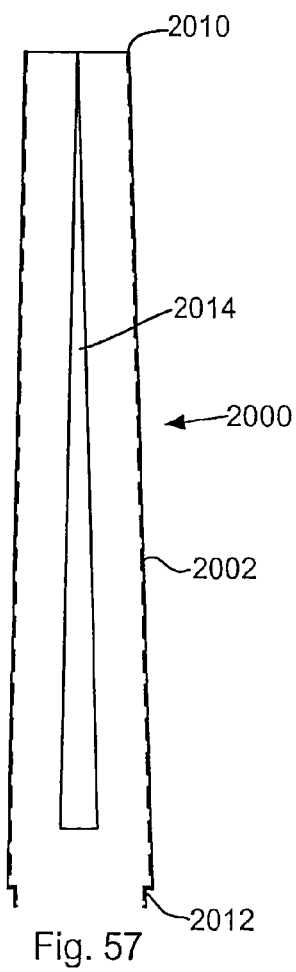
FIG. 57 is a schematic side view of an unloading device for opening the loading device of FIG. 56.
Figure 59:
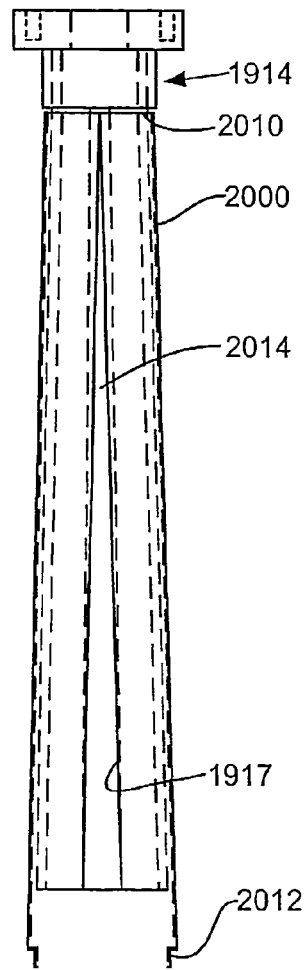
FIG. 59 is a schematic side view of the unloading device of FIG. 57 as it unloads the loading device of FIG. 56.

FIGS. 57-59 show another type of unloading device 2000, which unloads a loading device 1914 that has a slit 1917 (as shown in FIG. 56). The loading device 1914 is similar to some others described previously, in that it has a tubular sleeve extension 1922, a flange 1916, recesses 1932 for retaining dust, and an inlet opening 1924. The unloading device 2000 is a frustro-conical housing 2002 with a smaller diameter top 2010 and a larger diameter bottom 2012. Along the inner surface of the housing 2002 is a wedge 2014. The bottom 2012 includes a shoulder, which permits it to be placed into a reactor tube, with the shoulder resting on the tube sheet, if desired. Alternatively, the bottom of the unloading device 2000 may be placed over a bin to catch the pellets.

In order to unload pellets from the loading device 1914, the loading device 1914 is placed on top of the unloading device 2000, with the slit 1917 aligned with the wedge 2014. The loading device is then pushed downwardly into the housing 2002, with the wedge 2014 forcing the slit 1917 open and thereby gradually increasing the diameter of the sleeve 1922 of the loading device 1914 from the bottom to the top. This enables the pellets to fall out of the loading device 1914 in an orderly manner. FIG. 59 shows the loading device 1914 after it has been pressed down and the pellets have been released.

It would also be possible for the unloading device to have a wedge-shaped knife in the place of the wedge 2014 of FIGS. 57-59. In that case, it could be used to cut open any of the loading devices that do not have a slit in order to release the pellets from those loading devices.

Figure 60:
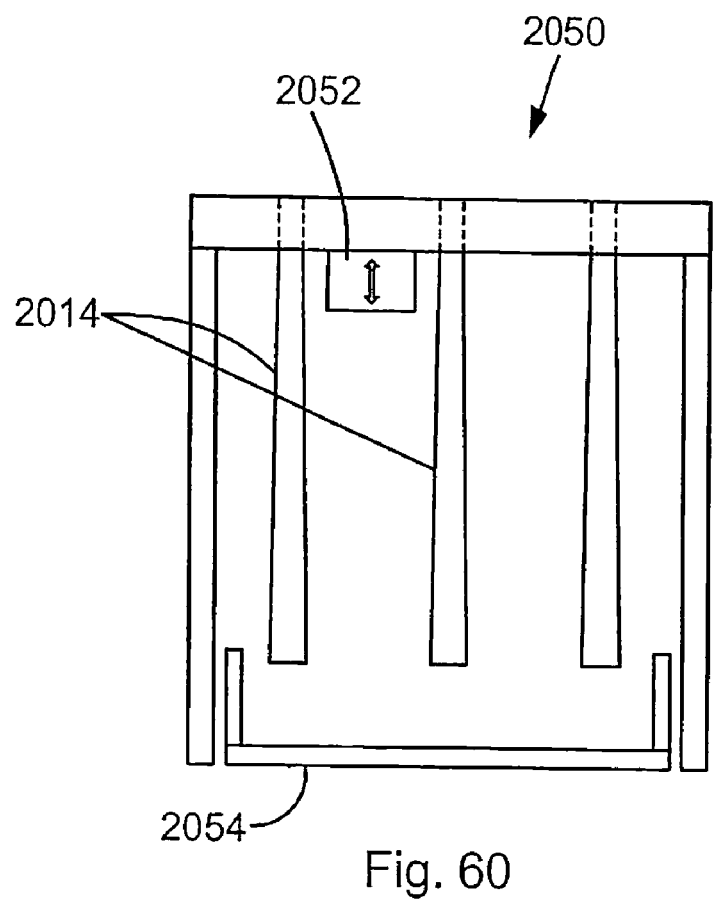
FIG. 60 is a schematic view of an unloading station including a plurality of unloading devices of FIG. 57.
Figure 61:
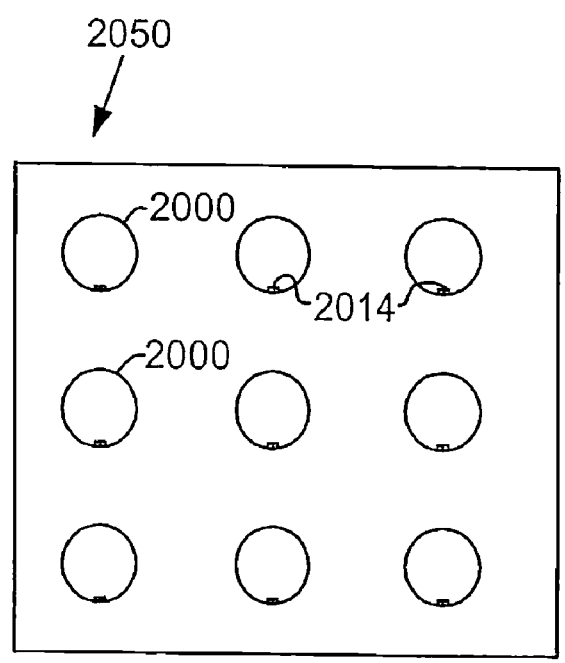
FIG. 61 is a top view of the unloading station of FIG. 60.

FIGS. 60 and 61 show an unloading station 2050, which includes a plurality of unloading devices 2000, each with its own wedge 2014. In this case, an axial vibrator 2052 has been installed on the station in order to impart a vertical vibration to the loading devices, which further assists with dislodging any bridged pellets. At the bottom of the unloading station 2050 is a bin or hopper 2054 for collecting the pellets.

FIG. 62 shows the bottom portion of the sleeve 2122 of another loading device. In this case, there is an insert 2130 at the bottom of the sleeve 2122, providing a reduced inside diameter 2132. The insert 2130 is shown by itself in FIG. 62A. This insert 2130 is adhered to the inside surface of the sleeve 2122.

FIG. 63 shows the bottom portion of the sleeve 2222 of another loading device. In this case, there is a cap 2230 at the bottom of the sleeve 2222, which provides a reduced inside diameter 2232. In this case, the cap 2230 is adhered to the outer surface of the sleeve 2222.

Figure 64A:
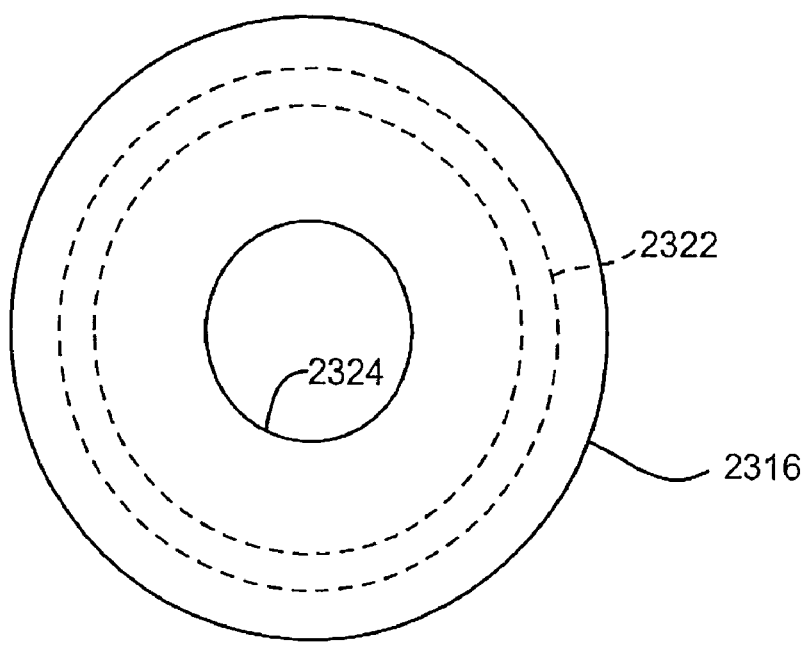
FIG. 64A is a top view of the loading device of FIG. 64.
Figure 64:
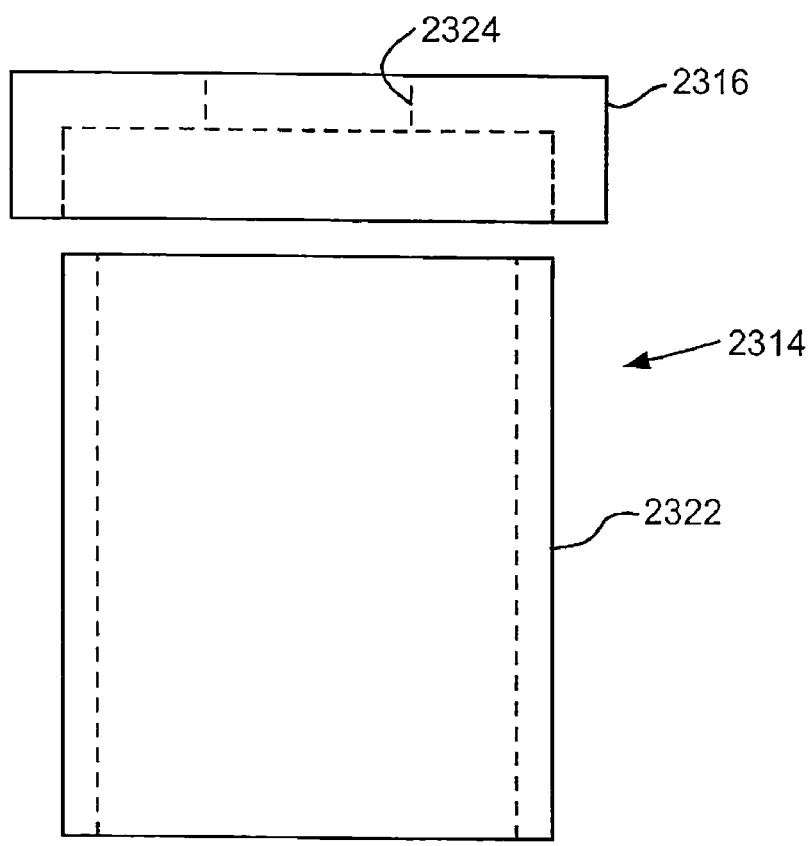
FIG. 64 is an exploded side view of a loading device made in accordance with the present invention.
Figure 66:
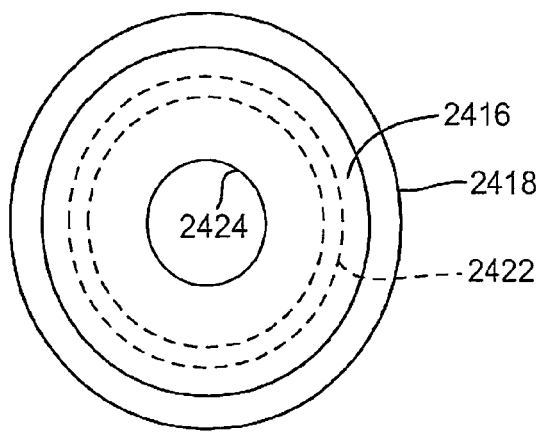
FIG. 66 is a top view of the loading device of FIG. 65.
Figure 67:
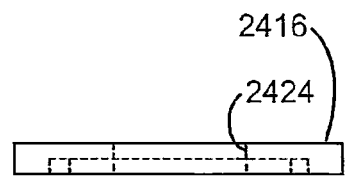
FIG. 67 is a schematic side view of the flange portion of the loading device of FIG. 65.
Figure 68:
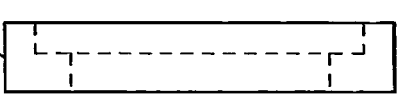
FIG. 68 is a schematic side view of the spacer portion of the loading device of FIG. 65.
Figure 65:
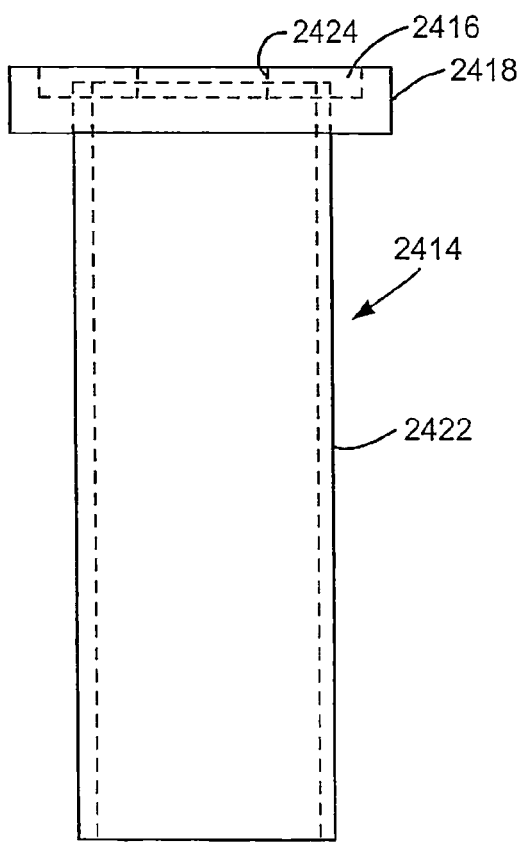
FIG. 65 is a schematic side view of another loading device made in accordance with the present invention.

FIG. 64 is an exploded perspective view of another loading device 2314, in which the sleeve 2322 is adhered directly to the inner surface of the flange 2316. This design is especially desirable when the reactor tube 10 has a small diameter, as there is no projection from the flange 2316 that extends into the tube 10 other than the sleeve 2322. Thus, the outside diameter of the sleeve 2322 can fit closely inside the reactor tube, with the flange 2316 resting on top of the tube sheet 12. FIG. 64A is a top view of this loading device 2314 after it has been assembled, and shows the top opening 2324, the flange 2316, and the sleeve 2322.

FIGS. 65-68 show an embodiment of a loading device 2414 similar to that of FIGS. 64 and 64A, except that, in addition to the flange 2416 with an inlet opening 2424 and the sleeve 2422, which are secured together, such as by gluing, there is a separate spacer 2418, which is slid up from the bottom of the sleeve 2422 to the flange 2416 and serves to space the flange 2416 above the tube sheet 12. This may be useful for ensuring that the flange 2416 is at the desired height to facilitate brushing the pellets onto the flange and into the opening 2424. It may be useful in situations in which the top surface of the tube sheet is rough, and in a variety of other situations.

It will be obvious to those skilled in the art that modifications may be made to the embodiments described above without departing from the scope of the present invention.

What is claimed is:

1. A method for loading pellets into a chemical reactor tube to a desired elevation, comprising the steps of:
    inserting a loading device into said chemical reactor tube, with an upper flange portion of the loading device resting on top of the reactor tube, said upper flange portion defining an inlet opening, and with a lower sleeve portion of the loading device extending downwardly from the upper flange portion into the chemical reactor tube, said lower sleeve portion defining a lower outlet opening, and said loading device defining a passageway extending downwardly from said inlet opening to said lower outlet opening;
    adding pellets through said inlet opening so the pellets fall through the passageway and into the reactor tube until the level of the pellets in the reactor tube reaches the lower outlet opening located at the desired elevation;
    adding more pellets to at least partially fill said lower sleeve portion;
    securing the pellets inside said lower sleeve portion so they remain with the loading device when it is removed from the reactor tube; and
    removing said loading device and its secured pellets from the reactor tube and leaving an open space in the reactor tube from the desired elevation to the top of the reactor tube.

2. A method for loading pellets into a chemical reactor tube as recited in claim 1, wherein the step of securing the pellets inside said lower sleeve portion includes reducing the internal cross sectional area of said lower sleeve portion near its lower outlet opening.

3. A method for loading pellets into a chemical reactor tube as recited in claim 1, wherein the step of securing the pellets inside said lower sleeve portion includes relying on the natural tendency of the pellets to bridge inside said lower sleeve portion.

4. A method for loading pellets into a chemical reactor tube as recited in claim 1, and further including the step of reducing the vertical component of velocity of pellets falling through the loading device by means of a flexible arm adjacent the inlet opening which contacts the pellets as they pass downwardly into the loading device.

5. A method for loading pellets into a chemical reactor tube as recited in claim 1, and further including the step of removing the secured pellets from the loading device outside of the reactor tube after removing the loading device from the reactor tube.

6. A method for loading pellets into a chemical reactor tube, comprising the steps of:
    inserting a loading device into, said chemical reactor tube, with an upper flange portion of the loading device resting on top of the reactor tube, said upper flange portion defining an inlet opening, and with a lower sleeve portion of the loading device extending downwardly from said upper flange portion into the chemical reactor tube, said loading device defining a passageway extending downwardly from said inlet opening through said lower sleeve portion to a lower outlet opening;
    adding pellets through said inlet opening so the pellets fall through the passageway and out the lower outlet opening into the reactor tube until the level of the pellets in the reactor tube reaches the lower outlet opening;
    adding more pellets to at least partially fill said lower sleeve portion;
    removing said loading device at least partially out of the reactor tube with at least some pellets retained in said lower sleeve portion; and then
    contacting said loading device with a mechanical vibration device to shake out said retained pellets, wherein the step of contacting the loading device with the mechanical vibration device includes extending a portion of the mechanical vibration device into the inlet opening of the loading device.

7. A method for loading pellets into a chemical reactor tube as recited in claim 1, wherein the step of securing said pellets includes using means for reducing the cross-sectional area of the loading device near the lower outlet opening.

8. A method for loading pellets into a chemical reactor tube as recited in claim 7, wherein said means for reducing the cross-sectional area has dimensions that are fixed relative to the lower sleeve portion.

9. A method for loading pellets into a chemical reactor tube as recited in claim 7, wherein said means for reducing the cross-sectional area has dimensions that are adjustable relative to said sleeve.

* * * * *